United States Patent
Harwood et al.

(10) Patent No.: US 9,571,278 B1
(45) Date of Patent: Feb. 14, 2017

(54) ENCRYPTION KEY RECOVERY IN THE EVENT OF STORAGE MANAGEMENT FAILURE

(71) Applicant: EMC Corporation, Hopkinton, MA (US)

(72) Inventors: John S. Harwood, Paxton, MA (US); Thomas E. Linnell, Northborough, MA (US); John T. Fitzgerald, Mansfield, MA (US); Amnon Izhar, Brookline, MA (US); Charles E. Arsenault, Westborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 351 days.

(21) Appl. No.: 14/059,339

(22) Filed: Oct. 21, 2013

Related U.S. Application Data

(63) Continuation of application No. 12/043,780, filed on Mar. 6, 2008, now Pat. No. 8,588,425.

(Continued)

(51) Int. Cl.
*H04L 9/32* (2006.01)
*G06F 11/30* (2006.01)
(Continued)

(52) U.S. Cl.
CPC ......... *H04L 9/0894* (2013.01); *G06F 11/1402* (2013.01); *G06F 12/1408* (2013.01)

(58) Field of Classification Search
CPC G06F 21/6218; G06F 11/1415; G06F 9/0897; G06F 17/30595; G06F 21/6227; G06F 21/577; G06F 21/6209; G06F 2211/007; G06F 2221/2107; G06F 21/33; G06F 21/445; G06F 21/57; G06F 21/606; G06F 21/602; G06F 2221/2119; G06F 21/335; G06F 2221/2115; G06F 21/80; G06F 21/34; G06F 2221/2153; G06F 21/10; H04L 63/06; H04L 69/24; H04L 9/0822; H04L 9/083; H04L 9/0894; H04L 9/3236; H04L 63/0428; H04L 63/102; H04L 63/105; H04L 63/168; H04L 63/062; H04L 9/0637; H04L 9/088; H04L 9/321; H04L 9/3247; H04L 9/3263; H04L 9/3271; H04L 63/0823; H04L 63/0869; H04L 2209/16; H04L 2209/38; H04L 2209/601; H04L 63/1483; H04L 63/123; H04L 63/1441; H04L 9/0838; H04L 2209/76; H04L 2209/88; H04L 9/0897; Y10S 707/99932; Y10S 707/99939; Y10S 707/99948; G06Q 20/3821; G06Q 20/3829; C07K 14/47; A01K 2217/05; A61K 38/00
See application file for complete search history.

(56) References Cited

U.S. PATENT DOCUMENTS

| | | |
|---|---|---|
| 5,206,939 A | 4/1993 | Yanai et al. |
| 5,604,800 A | 2/1997 | Johnson et al. |

(Continued)

OTHER PUBLICATIONS

Identifiers, SQL Server 2005, Dec. 12, 2006.*

(Continued)

*Primary Examiner* — Saleh Najjar
*Assistant Examiner* — Shu Chun Gao
(74) *Attorney, Agent, or Firm* — Polsinelli PC

(57) ABSTRACT

A data processing system stores encrypted data. Object identifiers are assigned to storage objects, and data encryption keys are assigned to the storage objects. When performing an operation upon a storage object, data encryption key failure may occur due to a corrupt or incorrect key. In this (Continued)

case, a copy of the data encryption key is fetched from a key server. It is possible for the association of the object identifiers with the data encryption keys to become lost or confused, so that the key server may fail to provide the correct key for a specified object identifier. Therefore, an absolute key identifier that is unique across the key server namespace also is stored in association with the object identifier in the storage system and in the key store of the key server, and the absolute key identifier is used as a failsafe for recovery of encrypted data.

20 Claims, 14 Drawing Sheets

Related U.S. Application Data

(60) Provisional application No. 61/017,120, filed on Dec. 27, 2007.

(51) Int. Cl.
 *G06F 21/00* (2013.01)
 *H04L 9/08* (2006.01)
 *G06F 15/16* (2006.01)
 *G06F 11/14* (2006.01)
 *G06F 12/14* (2006.01)

(56) References Cited

U.S. PATENT DOCUMENTS

| | | | |
|---|---|---|---|
| 5,931,947 A | 8/1999 | Burns et al. | |
| 6,044,468 A | 3/2000 | Osmond | |
| 6,061,770 A | 5/2000 | Franklin | |
| 6,076,148 A | 6/2000 | Kedem | |
| 6,118,874 A * | 9/2000 | Okamoto et al. | 380/282 |
| 6,209,059 B1 | 3/2001 | Ofer et al. | |
| 6,272,632 B1 * | 8/2001 | Carman et al. | 713/168 |
| 6,493,825 B1 | 12/2002 | Blumenau et al. | |
| 6,502,076 B1 * | 12/2002 | Smith | G06Q 30/02 705/14.54 |
| 6,502,205 B1 | 12/2002 | Yanai et al. | |
| 6,775,382 B1 * | 8/2004 | Al-Salqan | 380/286 |
| 6,792,518 B2 | 9/2004 | Armangau et al. | |
| 6,842,810 B1 | 1/2005 | Fitzgerald et al. | |
| 6,941,459 B1 * | 9/2005 | Hind et al. | 713/167 |
| 6,976,165 B1 | 12/2005 | Carpentier et al. | |
| 6,978,367 B1 * | 12/2005 | Hind et al. | 713/167 |
| 7,010,620 B1 | 3/2006 | Harwood et al. | |
| 7,051,182 B2 | 5/2006 | Blumenau et al. | |
| 7,082,100 B2 | 7/2006 | Linnell et al. | |
| 7,093,021 B2 | 8/2006 | Blumenau et al. | |
| 7,165,152 B2 | 1/2007 | Blumenau et al. | |
| 7,260,636 B2 | 8/2007 | Blumenau et al. | |
| 7,324,648 B1 | 1/2008 | Deaver et al. | |
| 7,458,102 B2 | 11/2008 | Rogers et al. | |
| 7,475,124 B2 | 1/2009 | Jiang et al. | |
| 7,574,560 B2 | 8/2009 | MacHardy et al. | |
| 7,627,756 B2 | 12/2009 | Fujibayashi et al. | |
| 7,636,739 B2 * | 12/2009 | Stefani | G06F 17/30911 |
| 7,647,417 B1 * | 1/2010 | Taneja | G06F 17/30902 709/230 |
| 7,716,180 B2 | 5/2010 | Vermeulen et al. | |
| 7,792,301 B2 | 9/2010 | Bharadwaj et al. | |
| 7,797,342 B2 * | 9/2010 | Banks et al. | 707/783 |
| 7,941,785 B2 * | 5/2011 | Cole | G06Q 10/10 707/610 |
| 8,005,227 B1 | 8/2011 | Linnell et al. | |
| 8,010,810 B1 | 8/2011 | Fitzgerald et al. | |
| 8,046,382 B2 * | 10/2011 | Valentin | G06F 17/30336 707/802 |
| 8,055,911 B2 | 11/2011 | Feng et al. | |
| 8,190,921 B1 | 5/2012 | Harwood et al. | |
| 8,261,068 B1 | 9/2012 | Raizen et al. | |
| 8,416,954 B1 | 4/2013 | Raizen et al. | |
| 8,498,417 B1 | 7/2013 | Harwood et al. | |
| 8,588,425 B1 | 11/2013 | Harwood et al. | |
| 2002/0110244 A1 | 8/2002 | Flanagan et al. | |
| 2002/0188605 A1 | 12/2002 | Adya et al. | |
| 2003/0021417 A1 * | 1/2003 | Vasic et al. | 380/277 |
| 2003/0046238 A1 | 3/2003 | Nonaka et al. | |
| 2003/0046572 A1 | 3/2003 | Newman et al. | |
| 2003/0115324 A1 | 6/2003 | Blumenau et al. | |
| 2003/0194092 A1 | 10/2003 | Parks et al. | |
| 2005/0013441 A1 | 1/2005 | Klein | |
| 2005/0028072 A1 | 2/2005 | Murthy | |
| 2005/0065986 A1 | 3/2005 | Bixby et al. | |
| 2005/0081048 A1 | 4/2005 | Komarla et al. | |
| 2005/0226059 A1 | 10/2005 | Kavuri et al. | |
| 2005/0289061 A1 | 12/2005 | Kulakowski et al. | |
| 2006/0005048 A1 | 1/2006 | Osaki et al. | |
| 2006/0018484 A1 | 1/2006 | Yoshihiro et al. | |
| 2006/0053308 A1 | 3/2006 | Zimmerman | |
| 2006/0062383 A1 | 3/2006 | Kaneda et al. | |
| 2006/0085636 A1 | 4/2006 | Osaki | |
| 2006/0143476 A1 | 6/2006 | McGovern | |
| 2006/0143505 A1 | 6/2006 | Olarig et al. | |
| 2007/0083657 A1 | 4/2007 | Blumenau et al. | |
| 2007/0101134 A1 | 5/2007 | Parlan et al. | |
| 2007/0116287 A1 | 5/2007 | Rasizade et al. | |
| 2007/0165208 A1 | 7/2007 | Cowburn et al. | |
| 2007/0179934 A1 | 8/2007 | Basov et al. | |
| 2007/0179990 A1 | 8/2007 | Zimran et al. | |
| 2007/0180239 A1 | 8/2007 | Fujibayashi et al. | |
| 2008/0025514 A1 | 1/2008 | Coombs | |
| 2008/0033960 A1 | 2/2008 | Banks et al. | |
| 2008/0065906 A1 | 3/2008 | Itagaki et al. | |
| 2008/0082835 A1 | 4/2008 | Asher et al. | |
| 2008/0092029 A1 | 4/2008 | Arakawa et al. | |
| 2008/0212781 A1 * | 9/2008 | Vennelakanti et al. | 380/277 |
| 2008/0219449 A1 | 9/2008 | Ball et al. | |
| 2009/0052670 A1 | 2/2009 | You et al. | |
| 2009/0083485 A1 | 3/2009 | Cheng | |
| 2010/0031022 A1 | 2/2010 | Kramer | |

OTHER PUBLICATIONS

A Taxonomy for Key Recovery Encryption Systems, Denning et al., May 11, 1997.*

You et al. Recording Protection System for Portable Extension, U.S. Appl. No. 60/956,978, filed Aug. 21, 2007, including a verified English Translation, 35 pages, United States Patent and Trademark Office, Arlington, VA.

Menezes et al., Handbook of Applied Cryptography, Oct. 17, 1996, pp. 387, 400-402, CRC Press, New York, NY.

Patterson, et al., Introduction to Redundant Arrays of Inexpensive Disks (RAID), Spring CompCon 89, Feb. 27-Mar. 3, 1989, pp. 112-117, IEEE Computer Society, IEEE, New York, NY.

"Introducing RAID 5 on Symmetrix DMX," EMC White Paper, Jan. 19, 2004, 12 pages, EMC Corporation, Hopkinton, MA.

"Enginuity: The Symmetrix Storage Operating Environment," EMC White Paper, 2005, 21 pages, EMC Corporation, Hopkinton, MA.

"EMC Symmetrix DMX Architecture," Product Description Guide, 2004, 76 pages, EMC Corporation, Hopkinton, MA.

Symmetrix 8000 Enterprise Storage Systems Product Description Guide, Mar. 2001, 46 pages, EMC Corporation, Hopkinton, MA.

"EMC CLARiiON CX3 Best Practices for Achieving "Five 9s" Availability," Feb. 2007, 14 pages, EMC Corporation, Hopkinton, MA.

Gobioff, et al, "Security for Network Attached Storage Devices," CMU-CS-97-185, Oct. 23, 1997, 20 pages, School of Computer Science, Carnegie Mellon University, Pittsburg, Pennsylvania.

Gibson, et al., "Filesystems for Network-Attached Secure Disks," CMU-CS-97-118, Jul. 1997, 18 pages, School of Computer Science, Carnegie Mellon University, Pittsburg, Pennsylvania.

Gibson, et al., "File Server Scaling with Network-Attached Secure Disks," Proceedings of the ACM International Conference on Measurement and Modeling of Computer Systems (Sigmetrics '97), Seattle, Washington, Jun. 15-18, 1997, p. 272-284, Association for Computing Machinery, New York, NY.

(56) References Cited

OTHER PUBLICATIONS

Gibson, et al., "A Case for Network-Attached Secure Disks," CMU-CS-96-142, Sep. 26, 1996, 19 pages, School of Computer Science, Carnegie Mellon University, Pittsburg, Pennsylvania.

Gong. Li, A Security Identity-Based Capability System, Jan. 1989, 16 pages, University of Cambridge Computer Laboratory, Cambridge, England.

IEEE P1619.3(TM)/D1, Draft Standard for Key Management Infrastructure for Cryptographic Protection of Stored Data, May 2007, 44 pages, IEEE, Piscataway, NJ.

IEEE P1619.1(TM)/D16 Standard for Cryptographic Protection of Data on Block-Oriented Storage Devices, May 2007, IEEE, Piscataway, NJ.

IEEE P1619(TM)ID20 Draft Standard for Authenticated Encryption with Length Expansion for Storage Devices, Jun. 2007, 38 pages, IEEE, Piscataway, NJ.

FIPS Publication 197, Announcing the Advanced Encryption Standard (AES), Nov. 26, 2001, 51 pages, National Institute of Standards and Technology, Gaithersburg, MD.

FIPS Publication 140-2, Security Requirements for Cryptographic Modules, May 25, 2001, 69 pages, National Institute of Standards and Technology, Gaithersburg, MD.

FIPS Publication 198, The Keyed-Hash Message Authentication Code (HMAC), Mar. 6, 2002, 20 pages, National Institute of Standards and Technology, Gaithersburg, MD.

Network Working Group, G. Waters, Editor, "User-based Security Model for SNMPv2," RFC 1910, Feb. 1996, 40 pages, The Internet Society, Reston, VA.

IEEE Project 1619.1 Home, Project Authorization Request (PAR), Standard for Authenticated Encryption with Length Expansion for Storage Devices, internet status page printed Nov. 27, 2007, 3 pages, IEEE, Piscataway, NJ.

IEEE P1619(TM)/D19 Draft Standard for Cryptographic Protection of Data on Block-Oriented Storage Devices, Oct. 2007, IEEE, Piscataway, NJ.

GXC3 Core, P1619 / 802.1ae (MACSec) GCM/XTS/CBC-AES Core, ipcores.com datasheet, Nov. 2007, 3 pages, IP Cores, Inc., Palo Alto, CA.

Maheshwari, Umesh, et al., "How to Build a Trusted Database System on Untrusted Storage," Proceeding OSDI'00 Proceedings of the 4th conference eon Symposium on Operating System Design & Implementation, Oct. 23-25, 2000, Paradise Point Resort, San Diego, CA, Proceedings vol. 4, 2000, USENIX Association, Berkeley, CA.

Pariseau, Beth, "Cisco, EMC partner on SAN encryption," May 24, 2007, 5 pages, ComputerWeekly.com., TechTarget, Newton, MA.

Pariseau, Beth, "EMC plans array-based encryption via PowerPath," Feb. 8, 2007, 3 pages, ComputerWeekly.com, TechTarget, Newton, MA.

Guide to Storage Encryption Technologies for End User Devices, Karen Scarfone, Murugiah Souppaya and Matt Sexton, U.S. Department of Commerce Special Publication 800-111, Nov. 2007, National Institute of Standards and Technology Gaithersburg, MD.

EMC Corporation White Paper, Approaches for encryption of Data-at-Rest in the Enterprise, A Detailed Review, Part No. H4173, Jan. 2008, 24 pages, EMC Corporation, Hopkinton, MA.

"An enterprise strategy for data encryption and key management", 4AA1-6170ENW, Oct. 2007, eight pages, Hewlett-Packard Development Company, Palo Alto, CA.

Tucek, et al., Trade-offs in protecting storage: a meta-data comparison of cryptographic, backup/versioning, immutable/tamper-proof, and redundant storage solutions, Mass Storage Systems and Technologies, 2005, Proceedings. 22nd IEEE / 13th NASA Goddard Conference on, Apr. 11-14, 2005, Monterey, CA, pp. 329-340, IEEE, New York, NY.

Poolet, Michelle A., SQL by Design: How to Choose a Primary Key, SQLMag.com, Mar. 31, 1999, 6 pages, Penton, New York, NY.

Reserved Keywords (Transact-SQL), SQL Server 2005, Jul. 17, 2006, 12 pages, Microsoft Corporation, Redmond, WA.

Key_ID (Transact-SQL), SQL Server 2005, 2015, 2 pages, Microsoft Corporation, Redmond, WA.

Sys.key_encryptions (Transact-SQL), SQL Server 2005, 2015, 2 pages, Microsoft Corporation, Redmond, WA.

* cited by examiner

| KEY TABLE | |
|---|---|
| OBJECT ID | WRAPPED KEY INFO. |
| 12345 | --------- |
|  |  |
|  |  |
| -<br>-<br>- | -<br>-<br>- |

FIG. 2

| DEVICE TABLE | | | |
|---|---|---|---|
| OBJECT ID | KEY UUID | DEVICE INFO. | KEY POLICY |
| 12345 | 7890 | --------- |  |
|  |  |  |  |
|  |  |  |  |
| -<br>-<br>- | -<br>-<br>- | -<br>-<br>- |  |

FIG. 3

| KEY STORE | | | | |
|---|---|---|---|---|
| DOMAIN NAME | OBJECT ID | KEY UUID | WRAPPED KEY INFO. | KEY POLICY |
| EMC98765 | 12345 | 7890 | - - - - - - - - - | - - - - |
|  |  |  |  |  |
|  |  |  |  |  |
| - - - | - - - | - - - | - - - | - - - |

ENCRYPTION KEY RECOVERY IN THE EVENT OF STORAGE MANAGEMENT FAILURE

RELATED APPLICATIONS

This application claims the benefit of John S. Harwood et al., U.S. Provisional Application Ser. 61/017,120 filed 27 Dec. 2007, entitled Encryption Key Recovery in the Event of Storage Management Failure, incorporated herein by reference. This application is a continuation of John S. Harwood et al., U.S. application Ser. No. 12/043,780 Filed Mar. 6, 2008, entitled Encryption Key Recovery in the Event of Storage Management Failure, incorporated herein by reference, and issued on Nov. 19, 2013 as U.S. Pat. No. 8,588,425.

FIELD OF THE INVENTION

The present invention relates to a storage system that stores data in encrypted form, and performs decryption when the encrypted data is recalled from storage.

BACKGROUND OF THE INVENTION

Storage of data in encrypted form has often been used to preserve secrecy of highly classified government data. More recently there has been an increasing need for businesses to preserve sensitive customer data such as trade secrets, credit card numbers, and medical records. Storage of encrypted data on a data storage device such as a disk drive not only protects against theft of information if the data storage device is stolen, but also protects against inadvertent disclosure if the data storage device is not erased when it is re-configured for another user or retired from service.

A number of encryption techniques have been standardized, and some have been designed for encrypting stored data. One well-known standard encryption technique is the Advanced Encryption Standard (AES) described in the Federal Information Processing Standards (FIPS) Publication 197 published Nov. 26, 2001, by the United States National Institute of Standards and Technology (NIST), Gaithersburg, Md. AES uses a symmetric cryptographic key of 128, 192, or 256 bits to encrypt and decrypt data in blocks of 128 bits.

To encrypt a string of plaintext blocks, a selected encryption mode is layered over AES. Standard encryption modes often layered over AES include the Cipher Block Chaining (CBC) mode, and the XTS mode.

In CBC mode, each plaintext block is exclusive-OR'd with the previous ciphertext block before the plaintext block is encrypted. The first plaintext block in the string is exclusive-OR'd with a pre-selected initialization vector. Decryption is a reverse of this process.

The XTS mode has been designed for encrypting data stored on disk or tape. The XTS mode is described in the Institute for Electrical and Electronic Engineers (IEEE) P1619/D19 Draft Standard for Cryptographic Protection of Data on Block-Oriented Storage Devices (October 2007), IEEE, Piscataway, N.J. In addition to the encryption key used by the AES block cipher, XTS layered over AES (XTS-AES) uses a "tweak key" to incorporate the logical position of the data block into the encryption. XTS-AES addresses threats such as copy-and-paste and dictionary attacks, while allowing parallelization and pipelining in cipher implementations.

Encryption of data for storage and decryption of data upon recall from storage requires some additional data processing resources. More troubling is the fact that encryption affects the reliability of data storage. Use of an improper key during encryption or loss of the proper key for decryption will cause the data to become unavailable or lost. Encryption may also interfere with standard methods of checking and testing data integrity.

To avoid using corrupted keys, some measures should be taken to verify the integrity of the keys in use. One method for ensuring key integrity is by using a "key signature." For example, this could be a Keyed-Hash Message Authentication Code (HMAC) computed over the cipher key using some higher-level key. In a similar fashion, the integrity of the stored ciphertext can be verified by using a HMAC key to compute a Message Authentication Code (MAC) over the ciphertext, and by storing the MAC with the ciphertext so that the MAC can be verified upon recall of the stored ciphertext. These integrity verification techniques are described in the IEEE P1619.1/D20 Draft Standard for Authenticated Encryption with Length Expansion for Storage Devices (June 2007), IEEE, Piscataway, N.J., and the IEEE P1619.3/D1, Draft Standard for Key Management Infrastructure for Cryptographic Protection of Stored Data (May 2007), IEEE, Piscataway, N.J. The HMAC is further described in FIPS Publication 198, The Keyed-Hash Message Authentication Code (HMAC), Mar. 6, 2002, National Institute of Standards and Technology, Gaithersburg, Md.

SUMMARY OF THE INVENTION

In accordance with one aspect, the invention provides a method of encryption key recovery. The method includes creating a storage object for containing encrypted data in data storage of a data storage system, assigning an object identifier to the storage object for identifying the storage object in the data storage system, assigning a data encryption key to the storage object, assigning a key identifier to the data encryption key, storing the data encryption key in the data storage system in association with the object identifier, and storing the key identifier in the data storage system in association with the object identifier. The method further includes, when performing an operation upon the storage object using the data encryption key in the data storage system, detecting failure of the data encryption key in the data storage system, and in response to detecting failure of the data encryption key in the data storage system, fetching the key identifier associated with the object identifier, and using the key identifier associated with the object identifier for fetching a copy of the data encryption key from a key server, and resuming the operation upon the storage object using the copy of the data encryption key fetched from the key server.

In accordance with another aspect, the invention provides a method of encryption key recovery. The method includes creating a storage object for containing encrypted data in data storage of a data storage system, assigning an object identifier to the storage object for identifying the storage object in the data storage system, obtaining a key identifier and a data encryption key assigned to the storage object from a key server, storing the key identifier and the data encryption key in the data storage system in association with the object identifier, and storing the key identifier and a copy of the data encryption key in association with the object identifier and an identifier of the data storage system in a key store of the key server. The method further includes performing an operation upon the storage object using the data encryption key in the data storage system, and when performing the operation upon the storage object using the data encryption key in the data storage system, detecting failure of the data encryption key in the data storage system, and in response to detecting failure of the data encryption key in the data storage system, fetching the key identifier associated with the object identifier, and using the key identifier associated with the object identifier for fetching a copy of the data encryption key from the key server, and resuming the operation upon the storage object using the copy of the data encryption key fetched from the key server.

In accordance with another aspect, the invention provides a data storage system including data storage, and at least one storage processor coupled to the data storage for storing data in the data storage. The storage processor is programmed for creating a storage object for containing encrypted data in the data storage, assigning an object identifier to the storage object for identifying the storage object in the data storage system, obtaining a key identifier and a data encryption key assigned to the storage object from a key server, and storing the key identifier and the data encryption key in the data storage system in association with the object identifier. The storage processor is further programmed for performing an operation upon the storage object using the data encryption key in the data storage system, and when performing the operation upon the storage object using the data encryption key in the data storage system, detecting failure of the data encryption key in the data storage system, and in response to detecting failure of the data encryption key in the data storage system, fetching the key identifier associated with the object identifier, and using the key identifier associated with the object identifier for fetching a copy of the data encryption key from the key server, and resuming the operation upon the storage object using the copy of the data encryption key fetched from the key server.

BRIEF DESCRIPTION OF THE DRAWINGS

Additional features and advantages of the invention will be described below with reference to the drawings, in which:

FIG. 2 is a block diagram of a key table introduced in FIG. 1;

FIG. 3 is a block diagram of a device table introduced in FIG. 1;

Figure 1:
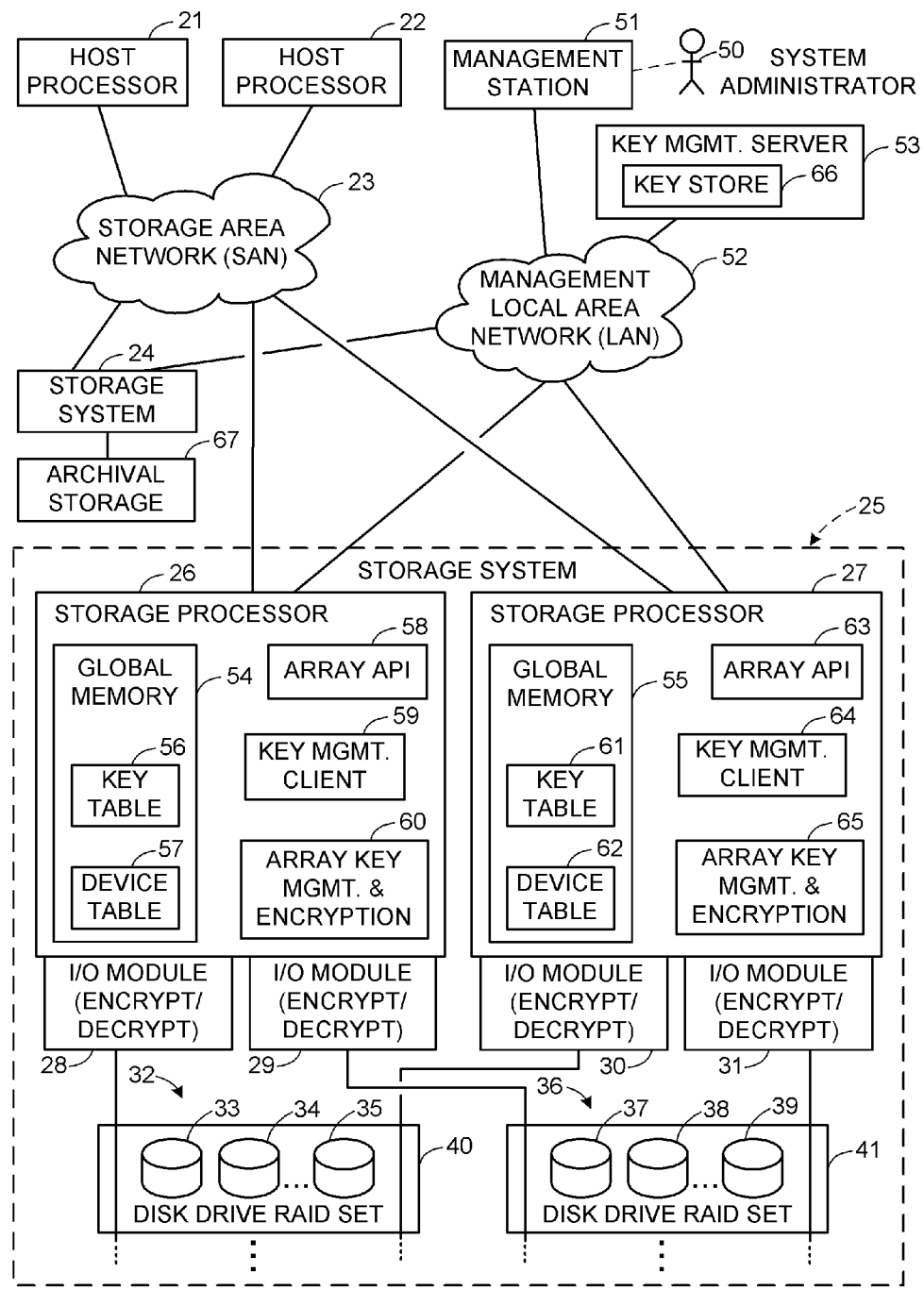
FIG. 1 is block diagram of a data processing system incorporating the present invention for storage of encrypted data.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention for storage of encrypted data. The data processing system includes a number of host processors 21, 22, linked by a storage area network (SAN) 23 to a number of storage systems 24, 25.

The host processors 21, 22 can be general purpose digital computers, or the host processors can be processors programmed for performing dedicated functions such as database management or file system management. For example, the host processors could be general purpose digital computers programmed for scientific or engineering applications. Or the host processors could be file system managers providing network attached storage for a multiplicity of workstations in a business enterprise.

The SAN 23 communicates requests from the host processors 21, 22 to the storage systems for read or write access to specified logical blocks of storage in the storage systems. For example, the storage in each storage system is configured into storage objects such as logical volumes or logical unit numbers (LUNs) of the logical blocks, and each host is given access rights to one or more of the storage objects. The SAN 23, for example, is a Fibre Channel or Internet Protocol (IP) network, and the hosts communicate with the storage systems using the Fibre Chanel (FC) protocol or the Small Computer Systems Interface (SCSI) over IP (iSCSI) protocol.

Prior to granting storage access to a host processor, a storage system may require host authentication via a secure mechanism, such as the Kerberos protocol. A storage system may require authentication of each storage access request, for example, using a secure mechanism, such as the protocol described in Blumenau et al. U.S. Pat. No. 7,093,021 issued Aug. 15, 2006.

For enhanced data availability, each storage system 24, 25 includes an array of dual-port disk drives, and a dual-redundant data path and processor architecture. For example, the storage system 25 includes a first storage processor 26 and a second storage processor 27. The first storage processor 26 includes a first input-output (I/.O) module 28 and a second I/O module 29. The second storage processor 27 includes a third I/O module 30 and a fourth I/O module 31.

The storage system 25 includes a first array 32 of disk drives 33, 34, . . . , 35 and a second array 36 of disk drives 37, 38, . . . , 39. Each disk drive in the first array of disk drives 32 is accessible through the first I/O module 28 or through the third I/O module 30. In a similar fashion, each disk drive in the second array of disk drives 36 is accessible through the second I/O module 29 or through the fourth I/O module 31. Therefore each disk drive is accessible regardless of failure of a single one of the processors 26, 27 or a single one of the I/O modules 28, 29, 30, 31.

In each array 32, 36, the disk drives are organized as redundant arrays of inexpensive disks (RAID), such as the RAID set 40 in the first array 32 and the RAID set 41 in the second array 36. For example, when the storage system 25 writes a block of data from a host processor to storage of one of the RAID sets 40, the block of data is written to one of the disk drives 33, 34, 35 in the RAID set, and a corresponding parity block in another one of the disk drives 33, 34, 35 in the RAID set is updated by a read-modify-write process. Later, if an attempt to read the data block from the disk drive fails, then the data block can be recovered (for the case of a single disk drive failure in the RAID set 40) by a parity computation upon the corresponding parity block and corresponding data blocks in the other disk drives of the RAID set. Further details regarding the storage and retrieval of data from a RAID set are found in Patterson, et al., Introduction to Redundant Arrays of Inexpensive Disks (RAID), Spring CompCon 89, Feb. 27-Mar. 3, 1989, pp. 112-117, IEEE Computer Society, IEEE, New York, N.Y.

Prior to host access, a system administrator 50 configures each storage system 24, 25 so that the disk drives of each storage system are grouped into RAID sets, data blocks of the RAID sets are grouped into logical storage objects such as logical volumes or LUNs, and hosts are assigned access rights to one or more of the storage objects. For example, the mapping of logical data blocks to physical disk blocks can be performed by a table lookup, as described in Yanai et al., U.S. Pat. No. 5,206,939 issued Apr. 27, 1993. Hosts can be assigned access rights to one or more of the storage objects by programming an access control list (ACL) for each of the logical storage objects.

In the data processing system of FIG. 1, the system administrator 50 has a management station 51 from which the system administrator may remotely configure each of the storage systems 24, 25. For enhanced reliability and security, the management station 51 is interconnected to the storage systems 24, 25 via a dedicated management local area network (LAN) separate from the storage area network 23. The management LAN 52 may use a secure network communication protocol, or security features may be added to an ordinarily insecure network management protocol, for example, as described in Osmond U.S. Pat. No. 6,044,468 issued Mar. 28, 2000.

The present invention more particularly concerns storage and retrieval of encrypted data using encryption keys. For example, in the data processing system of FIG. 1, the storage system 25 receives plaintext from each host processor 21, 22, and encrypts the plaintext using a data encryption key to produce ciphertext. The ciphertext and not the plaintext is stored on the disk drives in the disk arrays 32, 36. Therefore, the plaintext is not exposed if a disk drive is stolen or if the disk drive is not erased before the disk drive is retired from service or re-assigned to another host.

In a preferred implementation, encryption and decryption is performed in each I/O module 28, 29, 30, and 31. Alternatively, the encryption and decryption could be performed by each storage processor or by an encryption and decryption offload device controlled by the storage processor, so that ciphertext and not plaintext is streamed to an I/O module during a write to storage.

In another alternative arrangement, plaintext is streamed to a disk drive, and a processor in the disk drive is programmed to encrypt the plaintext and store the ciphertext on the disk drive, and to decrypt the ciphertext when the ciphertext is read from the disk drive. For enhanced security, if the encryption or decryption is performed by a processor in the disk drive, then the key for the encryption or decryption is provided to the disk drive only when needed, and it is kept in volatile memory of the disk drive while being used, and erased from the volatile memory as soon as it has been used.

By performing encryption and decryption in each I/O module, it is easy to provide the additional processing resources required for encryption and decryption because the encryption and decryption is pipelined with the other functions of the storage processor. The I/O module can be constructed so that it is compliant with the government standard of FIPS publication 140-2 Security Requirements for Cryptographic Modules, May 25, 2001, National Institute of Standards and Technology, Gaithersburg, Md.

For example, the data processing system has a key management server 53 separate from the storage systems 24, 25. The key management server 53 provides a secure backup for the data encryption keys and key encryption keys used by the storage systems 24, 25. The key management server securely logs key creation and deletion operations. The key management server is maintained with an availability of at least as great as the availability of the storage in the storage systems 24, 25. The key management server 53, for example, is located in a physically secure area including the management station 51. The key management server 53, for example, responds to a "get key" request for a data encryption key from a storage server by returning the data encryption key encrypted with a key encryption key, and sending this "wrapped key" to a storage processor 26, 27 of the storage system 25. For example, the key management server 53 is constructed so that it is compliant with the IEEE P1619.3/D1, Draft Standard for Key Management Infrastructure for Cryptographic Protection of Stored Data (May 2007), IEEE, Piscataway, N.J.

When an I/O module needs a data encryption key, it unwraps the wrapped key by decrypting the wrapped key with the key encryption key. In this fashion, unencrypted data encryption keys may exist only where they can be protected by physical means from unauthorized access. For example, the unencrypted data encryption keys are kept in volatile memory of an application specific integrated circuit (ASIC) in the I/O module, and the ASIC is encased in a fiberglass-epoxy material on the I/O module or encased in another form of a tamper proof or resistant shell or material.

The wrapped data encryption key also includes a redundancy code such as a Message Authentication Code (MAC) so that the I/O module can verify the integrity of the data encryption key before the I/O module uses the data encryption key for encrypting plaintext from a host. If the MAC indicates corruption of the data encryption key, then the I/O module discards the data encryption key, the error is reported to the management station 51, and the storage system sends a "get key" request to the key management server 53 to obtain a new copy of the wrapped data encryption key.

In a similar fashion, the integrity of the stored ciphertext is verified by a redundancy code such as a MAC stored with the ciphertext. When the stored ciphertext is recalled and decrypted in response to a read request from a host processor, the redundancy code is verified. If the redundancy code indicates corruption, then the decrypted plaintext is discarded. An attempt is made to recover from this error by accessing each corresponding parity block and its related data blocks on the RAID set, re-computing the ciphertext using a parity calculation upon the corresponding parity blocks and their related data blocks on the RAID set, and again decrypting this recomputed ciphertext.

The detection of key or data corruption, and recovery from a single-disk error in a RAID set, however, might not be sufficient to recover data that has become unavailable due to use of an improper key during encryption or loss of the proper key for decryption. To ensure availability of a proper key for encryption and decryption of each storage object to be encrypted or decrypted, the storage systems 24, 25 and the key management server 53 maintain an association of object identifiers and respective data encryption keys for the storage objects to be encrypted or decrypted. In particular, when a data encryption key is assigned to a storage object, the data encryption key is associated with an object identifier identifying the storage object. The object identifier is linked to both the data encryption key and the storage object throughout the life of the data encryption key.

To ensure that a wrong key is not used during encryption or decryption of a storage object, the object identifier is verified prior to any use of the data encryption key for the storage object and performance of any I/O operation upon the storage object. For example, the data encryption key for the storage object is cryptographically bound to the object identifier of the storage object to provide an end-to-end key correctness check. Before the data encryption key is used for encrypting or decrypting a storage object, the object identifier bound to the data encryption key is tested to determine whether or not it identifies the storage object to be encrypted or decrypted. If the object identifier bound to the data encryption key does not identify the storage object to be encrypted or decrypted, then the data encryption key is a wrong key for encrypting or decrypting the storage object.

For example, wrapped key information for a storage object is produced by encrypting a combination of the data encryption key for the storage object and the object identifier for the storage object. When the I/O module is requested to encrypt or decrypt the storage object, the I/O module is given an object ID identifying the storage object, and the I/O module is also given wrapped key information. The I/O module "unwraps" the wrapped key information by decrypting the wrapped key information with a key encryption key to produce an unwrapped data encryption key and an unwrapped object identifier. The I/O module compares the unwrapped object identifier to the object identifier of the storage object to be encrypted or decrypted, and if the unwrapped object identifier is different from the object identifier of the storage object to be encrypted or decrypted, then the I/O module returns an error instead of encrypting or decrypting the storage object with the unwrapped data encryption key.

A catastrophic failure could cause confusion of the object identifiers and their associated data encryption keys so that the cryptographic binding of the object identifiers to the keys would not necessarily detect use of the wrong key for encryption or decryption. A catastrophic failure also could cause a loss of the association of an object identifier with its associated data encryption key. For example, in a data processing system having multiple storage systems sharing a key management server but having separate namespaces for storage objects, recovery from a catastrophic failure could cause a data encryption key for a storage object encrypted on one of the storage systems to become confused the data encryption key for a storage object encrypted on another one of the storage systems. A similar problem could arise when a storage system attempts to decrypt a backup or archive copy that was encrypted on another storage system having a different namespace, and the storage system cannot find the object ID of the backup or archive copy in its own namespace.

To provide a failsafe key recovery mechanism in the event of confusion or loss of the association of an object identifier with its respective data encryption key, the storage systems 24, 25 and the key management server 53 also maintain a backup index to the data encryption keys in the key server context. The backup index associates the object identifiers and their data encryption keys with an absolute key reference. If a storage system has a data encryption failure when using a data encryption key that passes the key correctness check, then the storage system can use the absolute key reference to request a new copy of the data encryption key from the key management server 53.

A storage system can also use the absolute key reference to request the correct encryption key from the key management server 53 when the storage system cannot find, in its own namespace, the object ID of a backup or archive copy of a storage object. In the storage system of FIG. 1, for example, the storage system 24 may access archival storage 67 containing backup copies of objects in its own storage as well as backup copies of objects from the storage system 25. In this case, the storage system 24 may obtain the absolute key reference for a backup copy of an object from an index of the backup or archive copies, or from unencrypted metadata stored with the backup or archive copy. Thus, the absolute key reference can be used as a failsafe, key of last resort, to recover customer data in enterprise applications.

For example, in global memory 54, 55 of the storage processors 26, 27 of the storage system 25 of FIG. 1, there is kept a dual mapping of the relationship of storage objects to their data encryption keys. The global memory 54 of the first storage processor 26 includes a key table 56 providing a mapping of storage objects in the disk storage arrays 32, 36 to their respective wrapped data encryption keys, and a device table 57 providing a mapping of each storage object to one or more storage devices in the disk storage arrays. The device table 57 further provides a mapping of each storage object to the absolute key reference of the data encryption key for encrypting or decrypting the storage object.

For example, the first storage processor 26 is programmed with an array application program interface (API) 58 for receiving configuration and control commands from the management station 51. The first storage processor 26 is also programmed with a key management client 59 for sending "get key" requests to the key management server 53 and receiving replies from the key management server. The first storage processor 26 is further programmed with an array key management and encryption program module 60.

In a similar fashion, the global memory 55 of the second storage processor 27 also includes a key table 61, a device table 62, a key management client 64, and an array key management and encryption module 65. For redundancy, the key table 61 is maintained as a copy of the key table 56, and the device table 62 is maintained as a copy of the device table 57. Any updates to the key table 56 or the device table 57 are mirrored to the key table 61 or the device table 62, and any updates to the key table 61 or the device table 62 are mirrored to the key table 56 or the device table 57.

As shown in FIG. 2, the key table 56 stores object identifiers in association with their respective wrapped data encryption key information.

As shown in FIG. 3, the device table 57 stores the object identifiers in association with respective globally unique key identifiers (KEY UUID), respective device information, and respective key policy information. Each globally unique key identifier is unique with respect to the set of all data encryption keys used by the storage systems serviced by the key management server (53 in FIG. 1).

The device information in the third column of the device table 57 specifies a mapping of the logical extent of each storage object to storage of one or more of the disk drives in the disk arrays 32 and 36. In general, the mapping of the logical extent of a storage object could be specified by a list of disk drive identifiers and an offset and extent for each of the disk drives. In practice, it is more convenient for the system administrator to configure the storage of the disk array into more regular sized storage objects, such as partitions of the disk drives, entire disk drive, stripes of data across the disk drives in the RAID sets, or the data storage of entire RAID sets. For example, the device information includes a RAID set identifier and an identifier of a particular disk drive partition within the RAID set or a particular data stripe across the disk drives in the RAID set. The device information for the storage object may also include a pointer to an access control list (ACL) specifying particular host processors having rights to access the storage object.

The key policy information specifies a block encryption algorithm in which the data encryption is used, a mode for encrypting a string of plaintext blocks using the block encryption algorithm, the key length, a key format, and a key lifetime. For example, the block encryption algorithm is AES, the mode is CBC or XTS, the key length is either 128 bits or 256 bits. The key format is either an unwrapped data encryption key, a data encryption key wrapped with a key encryption key, or a data encryption key and object data wrapped via a key encryption key. The default for the key lifetime is no expiration.

Figures 4, 5:
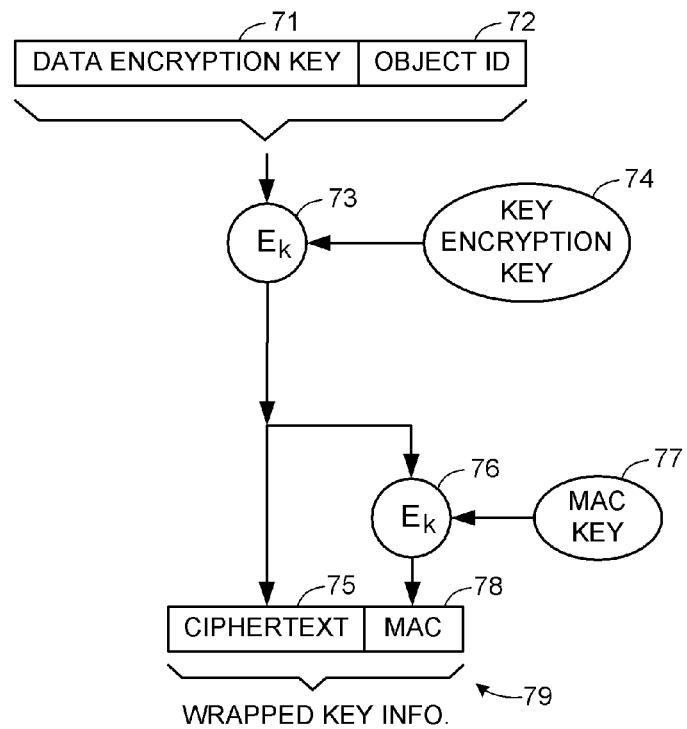
FIG. 4 is a block diagram of a key store introduced in FIG. 1.
FIG. 5 is a flow diagram of a process of encrypting a data encryption key together with information to be associated with the data encryption key to produce wrapped key information.

FIG. 4 shows the key store 66 containing the wrapped data encryption keys in the key management server (53 in FIG. 1). The key store 66 is organized as a table associating the wrapped key information for each data encryption key with a domain name, an object ID, a key UUID. The domain name identifies a domain within which each object ID is unique. For example, each storage system is a separate domain, and the domain name is a unique name for the storage system, such as a Universal Resource Identifier (URI) for the storage system. The key UUID is unique across all of the domains. For example, each time that the key management server puts wrapped key information for a new data encryption key into the key store, the key management server puts a new unique key UUID in the key store 66 in association with the wrapped key information.

When presented with a "get key" request including either a globally unique key identifier or an object ID from a key management client (59, 64 in FIG. 1), the key management server (53 in FIG. 1), for example, looks up the wrapped key information associated with this globally unique key identifier or object ID in the key store 66 and returns this wrapped key information to the key management client.

In an alternative construction for the key store 66, the key store 66 contains unwrapped data encryption keys instead of wrapped key information of the data encryption keys. In this case, when presented with a "get key" request, and based on the "get key" request and the key management client that originated the request, the key management server (53 in FIG. 1) looks up the unwrapped data encryption key associated with the globally unique key identifier or object ID in the key store 66, and then "wraps up" this data encryption key with its associated object ID, and returns this wrapped key information to the key management client.

FIG. 5 shows a process of creating the wrapped key information. For example, this process is performed by the key management server (53 in FIG. 1) when a key management client first requests a data encryption key for an object, or on all requests. In an alternative construction for the key management server, when the key management server receives the first request for a data encryption key for an object from a key management client, the key management server requests an I/O module of the storage processor of the key management client to create the wrapped key information and return the wrapped key information to the key management server.

To perform the process of FIG. 5, a new data encryption key 71 is produced by a secure pseudo-random number generator. This data encryption key 71 is concatenated with the object ID 72 of the object to be encrypted with the data encryption key. The combination of the data encryption key 71 and the object ID 72 is encrypted (step 73) with a key encryption key 74 to produce ciphertext 75. The key encryption key 74, for example, is unique to one or more of the I/O modules of the storage system of the key management client that is requesting the wrapped key information. At this time, the I/O modules of the storage processor have already been securely programmed with the key encryption key 74.

For example, in the storage system 25 of FIG. 1, the I/O modules 28 and 30 are programmed with one key encryption key, and the I/O modules 29 and 31 are programmed with another key encryption key. Each storage object in the storage system 25 is stored in either the first disk drive array 32 or in the second disk drive array 36. In this example, the particular storage array and I/O modules associated with the object are found by decoding the object ID. An object having an even object ID is stored in the first storage array 32 and accessed via the I/O module 28 or the I/O module 30, and an object having an odd object ID is stored in the second storage array 36 and accessed via the I/O module 29 or the I/O module 31.

In FIG. 5, for detection of key corruption, the ciphertext 75 is encrypted (step 76) by a MAC key 77 to produce a MAC 78. The MAC 78 is concatenated with the ciphertext 75 to produce the wrapped key information.

Figure 6:
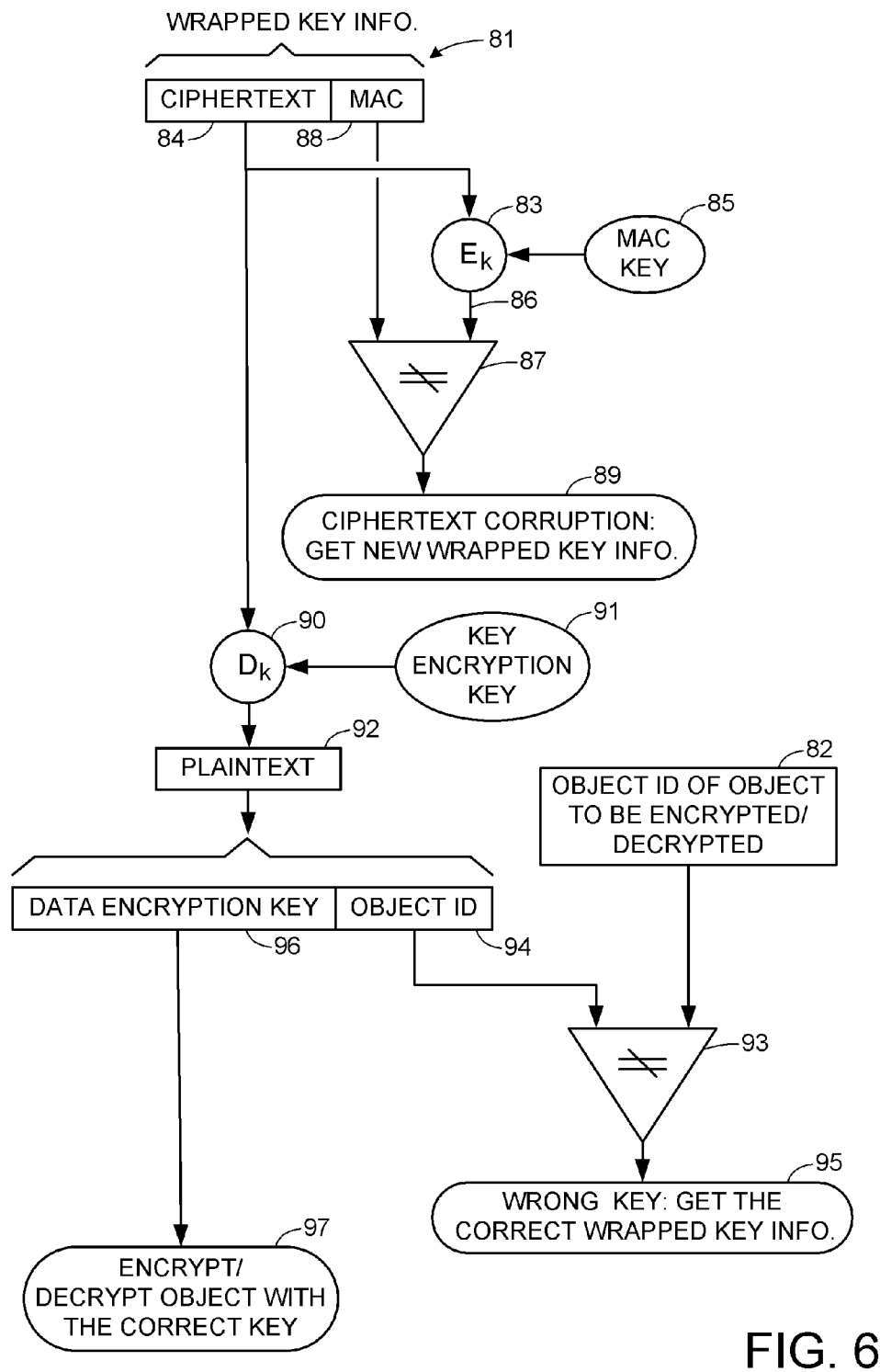
FIG. 6 is a flow diagram of a process of decoding, checking, and decrypting wrapped key information to produce a data encryption key for a specified data storage object.

FIG. 6 shows how an I/O module checks and decrypts the wrapped key information whenever an array key management and encryption module requests the I/O module to write encrypted data of an object to disk or read encrypted data of a storage object from disk. The array key management and encryption module provides, to the I/O module, wrapped key information 81 and an object ID 82 of the object to be encrypted or decrypted. The I/O module encrypts (step 83) the ciphertext 84 in the wrapped key information 81 with the MAC key 85 to produce an encryption result 86 that is compared (step 87) to the MAC 88 in the wrapped key information. If the comparison 87 indicates that the encryption result 86 is different from the MAC 88, then the ciphertext 84 is most likely corrupted, and the I/O module returns an error to the array key management and encryption module. In this case, the array key management and encryption module invokes its key management client to request a new copy of the wrapped key information from the key management server (step 89) in an attempt to recover from the error by re-initiating the process of FIG. 6 upon the new copy of the wrapped key information.

If the comparison 87 indicates that the encryption result 86 is the same as the MAC 88, then the I/O module decrypts (step 90) the ciphertext 84 of the wrapped key information 81 with the I/O module's key encryption key 91 to produce plaintext 92. The object ID 82 of the storage object to the encrypted or decrypted is compared (step 93) to the object ID 94 that was unwrapped from the wrapped key information 81 and appears in the plaintext 92. If the comparison 93 indicates that the object ID 82 of the storage object to the encrypted or decrypted is different from the object ID 94 unwrapped from the wrapped key information 81, then the data encryption key 96 unwrapped from the wrapped key information 81 is most likely a wrong data encryption key for encrypting or decrypting the storage object identified by the object ID 82. Therefore, in this case, the I/O module returns an error to the array key management and encryption module, and in response, the array key management and encryption module invokes its key management client to request a new copy of the wrapped data encryption key from the key management server (step 95) in an attempt to recover from the error by re-initiating the process of FIG. 6 upon the new copy of the wrapped key information.

If the comparison in step 93 indicates that the object ID 82 of the storage object to the encrypted or decrypted is the same as the object ID 94 unwrapped from the wrapped key information 81, then the data encryption key 96 unwrapped from the wrapped key information 81 and appearing in the plaintext 92 is most likely the correct key for decrypting the storage object. The I/O module encrypts or decrypts (step 97) the storage object with this data encryption key 96.

Figure 7:
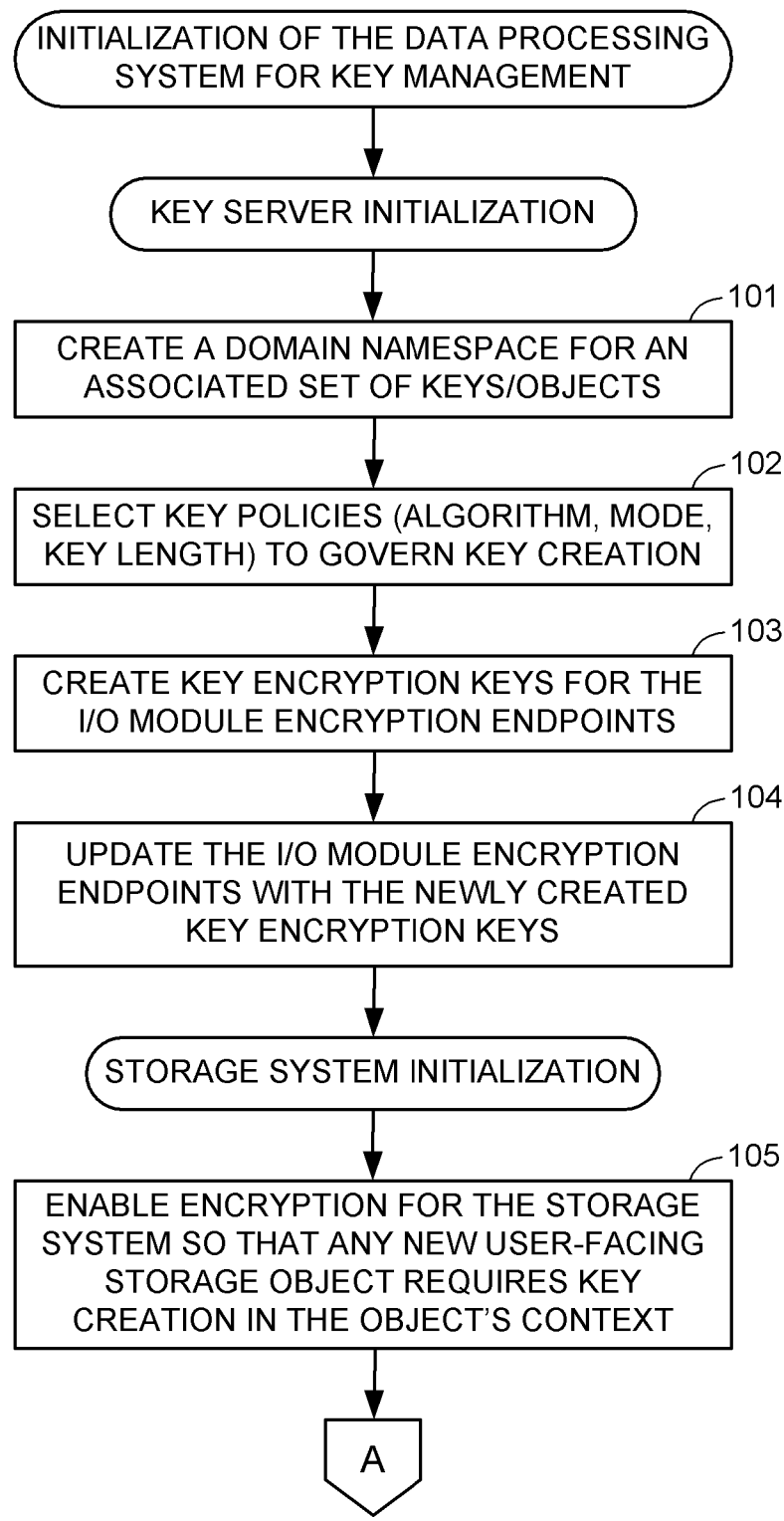
FIGS. 7 and 8 together comprise a flowchart of a procedure for initialization of the data processing system of FIG. 1 for key management.
Figure 8:
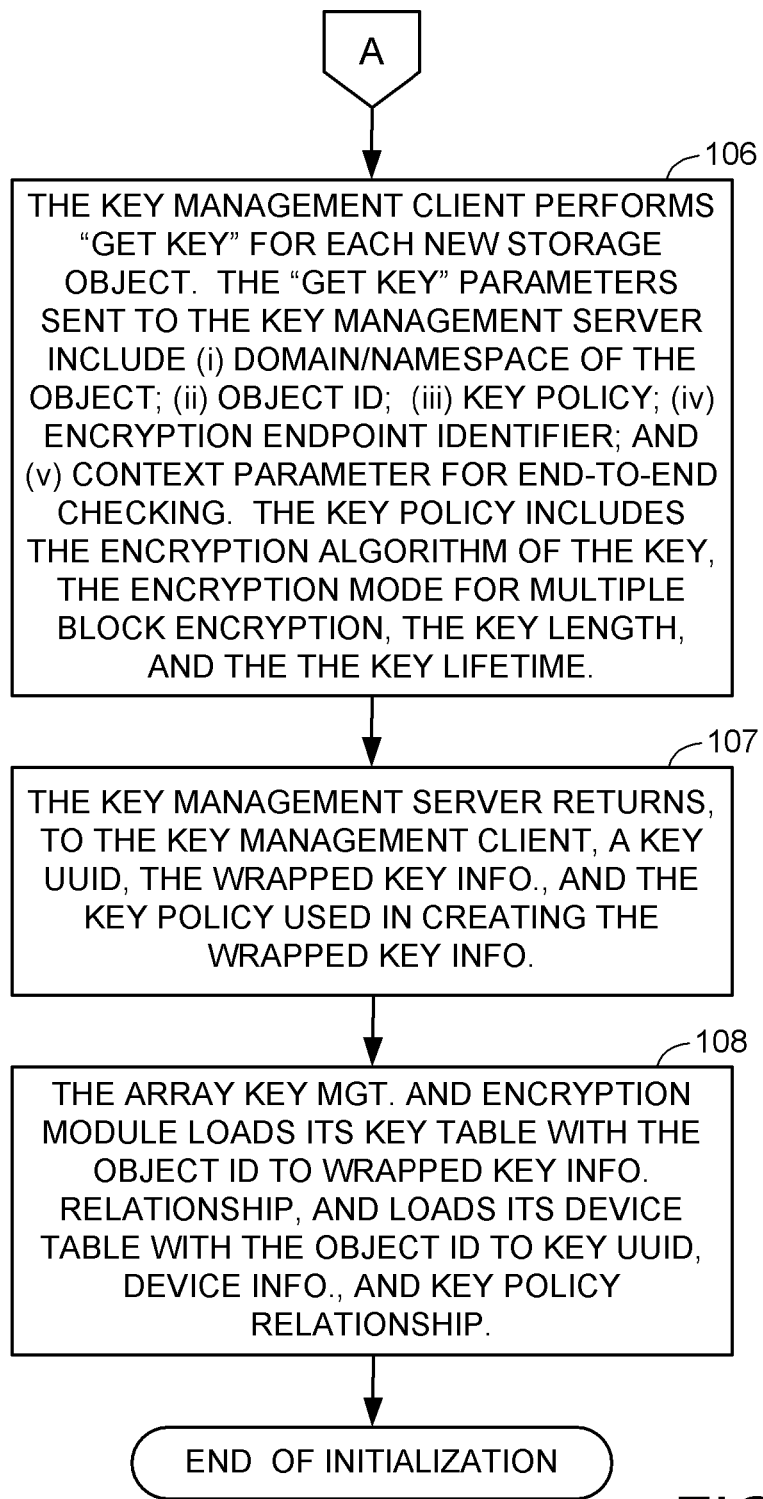

FIGS. 7 and 8 show a procedure for initialization of the data processing system of FIG. 1 for key management. This procedure includes key management server initialization (steps 101 to 104) followed by storage system initialization (steps 105 to 108).

In a first step of 101 of FIG. 7, the system administrator creates a domain namespace in the key management server for an associated set of keys and objects of a storage system. For example, the system administrator loads the key management server with the URI name of the storage system, and the key management server checks whether or not it already has been loaded with this URI name, and replies with an indication of success that the name has been accepted as a new name or an error message that the name has already been registered.

In step 102, the system administrator selects key policies in the key management server to govern key creation for the domain namespace. For example, the system administrator may specify that all data encryption keys for the domain namespace are to be wrapped with an associated object ID and encrypted with a key encryption key using a specified block encryption algorithm, mode, key length, and key lifetime.

In step 103, the system administrator requests the key management server to create key encryption keys for I/O module encryption endpoints in the domain namespace. The key management server creates the key encryption keys, and transmits them to the I/O module encryption endpoints in the domain namespace. In step 104, the I/O modules are updated with the newly created key encryption keys. For example, when the I/O modules are manufactured, they are initially programmed with well known key encryption keys, which must be updated before the I/O modules will perform encryption or decryption.

In step 105, the system administrator enables encryption for the storage system so that any new user-facing storage object requires key creation in the object's context. Therefore, in step 106, when a storage processor services a host processor request for creation of a new storage object, the key management client of the storage processor issues a "get key" request to the key management server for the new storage object. The "get key" parameters sent to the key management server include: (i) the domain name of the namespace of the storage object; (ii) the object ID; (iii) the key policy; (iv) an encryption endpoint identifier; and (v) a context parameter for end-to-end checking. The key policy includes the block encryption algorithm for the key, the encryption mode for multiple block encryption, the key length, and the key lifetime.

The key management server checks the "get key" parameters against the context parameter to detect any corruption of the "get key" parameters, looks up the specified domain name to verify that the domain name has been registered, and compares the requested key policy with any key policy requirements that have been registered with the domain name, in order to select a key policy for creating the requested key. The key management server does a lookup of the object ID in existing entries in the key store for the domain name in order to determine whether a key has already been assigned to the specified object ID in the namespace of the specified domain name. The key management server returns an error message if the key management server requests a key for a new object and the server already finds that a data encryption key has already been created for the object. Otherwise, in accordance with the selected key policy, the key management server creates a new key UUID and a new data encryption key and encodes the new data encryption key together with the specified object ID with the key encryption key for the specified encryption endpoint in the namespace of the specified domain.

In step 107, the key management server returns, to the key management client, the key UUID, the wrapped key information, and the selected key policy that was actually used in creating the wrapped key. In step 108, the array key management and encryption module loads its key table with the object ID to wrapped key info. relationship, and loads its device table with the object ID to key UUID, device info., and key policy relationship. At this point, the key management server and the storage system have been initialized for encryption or decryption of the object and for recovery from corruption of the key information for the object.

Figure 9:
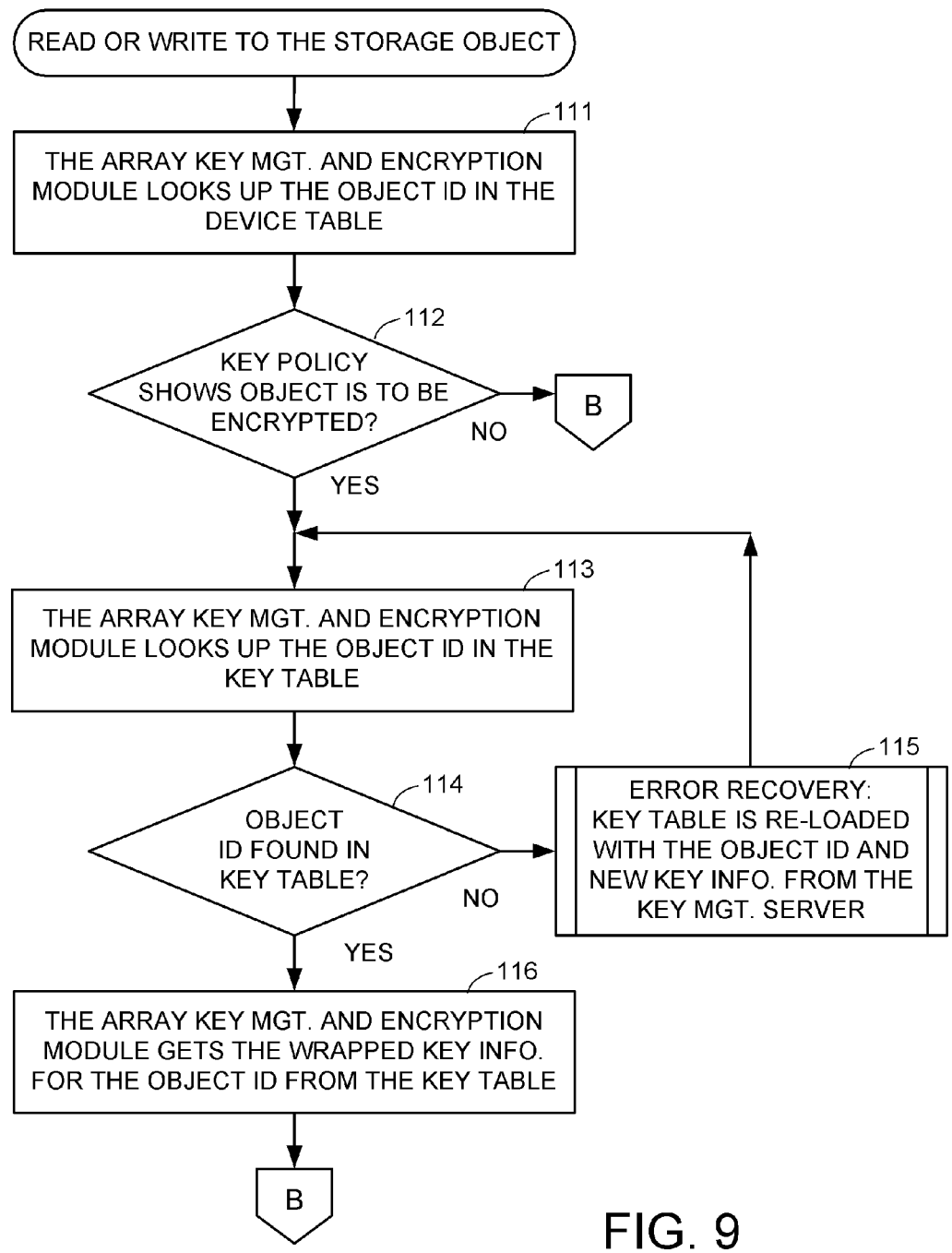
FIGS. 9 and 10 together comprise a flowchart of a procedure for reading or writing to a storage object in the data processing system of FIG. 1.
Figure 10:
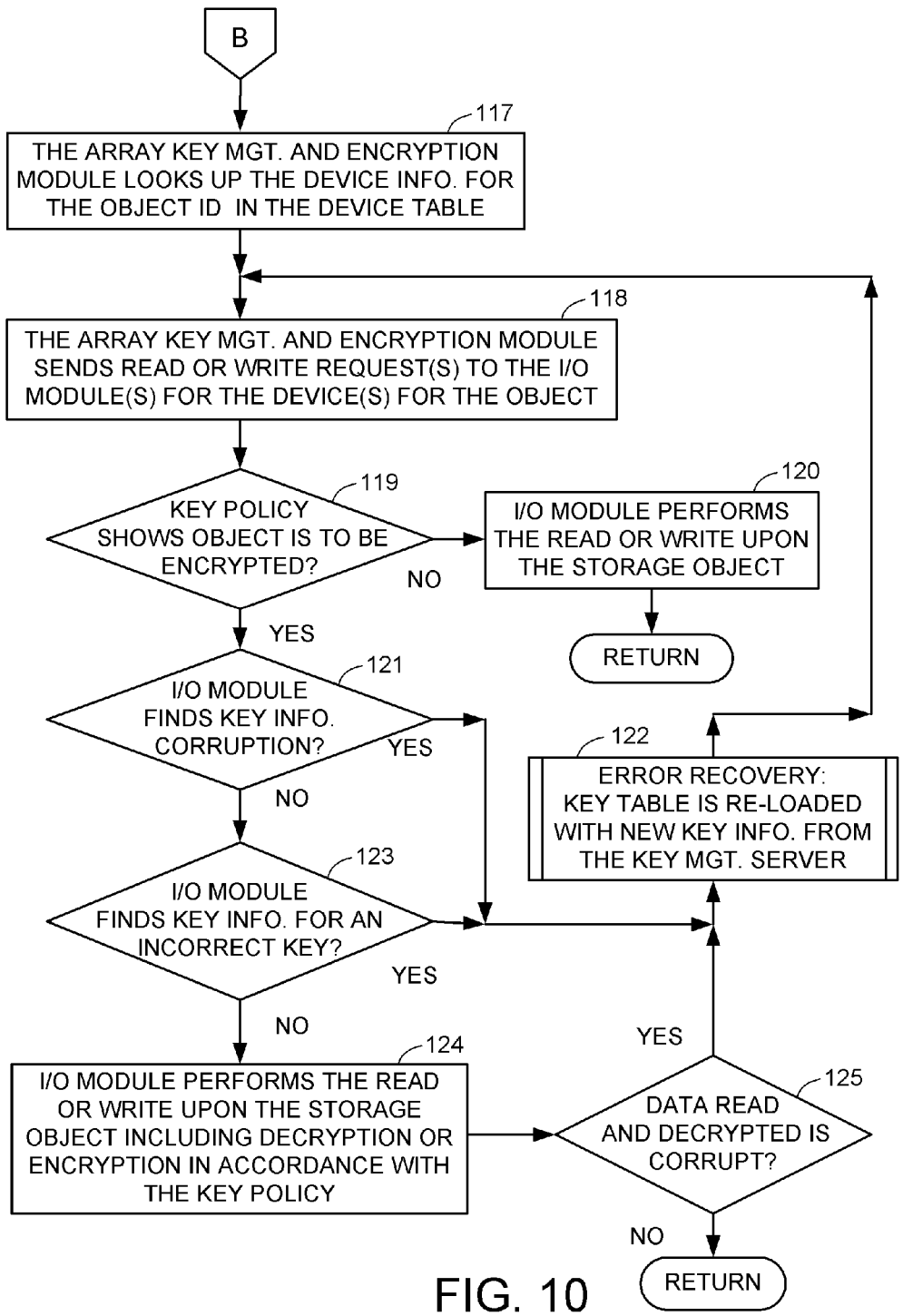

FIGS. 9 and 10 together comprise a flowchart of a procedure for reading or writing to a specified storage object in the data processing system of FIG. 1. In a first step 111, the array key management and encryption module looks up the object ID in its device table. In step 112, if the key policy in the device table shows that the object is to be encrypted, then execution continues to step 113. In step 113, the array key management and encryption module looks up the object ID in the key table. In step 114, if the object ID is not found in the key table, then execution branches to step 115 to perform error recovery, as described further below with reference to FIGS. 12-15. If the error recovery is successful, then the key table is re-loaded with the object ID and new key info. from the key management server, and execution loops back to step 113.

In step 114, if the object ID is found in the key table, then execution continues to step 116. In step 116, the array key management and encryption module gets the wrapped key info. for the object ID from the key table, and execution continues to step 117 in FIG. 10. Execution also continues to step 117 in FIG. 10 from step 112 if the key policy for the object specifies that the object is not to be encrypted.

In step 117 of FIG. 10, the array key management and encryption module looks up the device info. for the object ID in the device table. In step 118 the array key management and encryption module sends one or more read or write requests to one or more I/O modules for accessing the disk drives storing one or more logical extents of the object. In step 119, if the key policy does not show that the object is to be encrypted, then execution branches to step 120. In step 120, the I/O module performs the read or write upon the storage object, and execution returns.

In step 119, if the key policy shows that the object is to be encrypted, then execution continues to step 121. In step 121, if any of the I/O modules finds corruption of the key information for the object, as described above with reference to FIG. 6, then execution branches from step 121 to step 122 to perform error recovery by attempting to fetch a new copy of the key information from the key management server, as described above with reference to step 115. If this error recovery is successful, then the key table is re-loaded with new key information from the key management server, and execution loops back to step 118 to re-start the I/O operation with the new key information.

In step 121, if the I/O module does not find corruption of key information, then execution continues to step 123. In step 123, if the I/O module finds that the key information is not the correct key information for the specified object ID, as described above with reference to FIG. 6, then execution branches to step 122 to perform error recovery. Otherwise, execution continues from step 123 to step 124. In step 124, the I/O module performs the read or write operation upon the storage object including decryption for a read or encryption for a write in accordance with the key policy. In step 125, for a read operation, if data read and decrypted is found to be corrupt, for example as indicted by a redundancy code or a MAC in the data, this is likely due to the wrong data encryption key being used, for example, because the data encryption key is the key for a different object in the namespace of another data storage system. In this case, execution branches from step 125 to step 122 to perform error recovery. Otherwise, execution returns from step 125.

Figure 11:
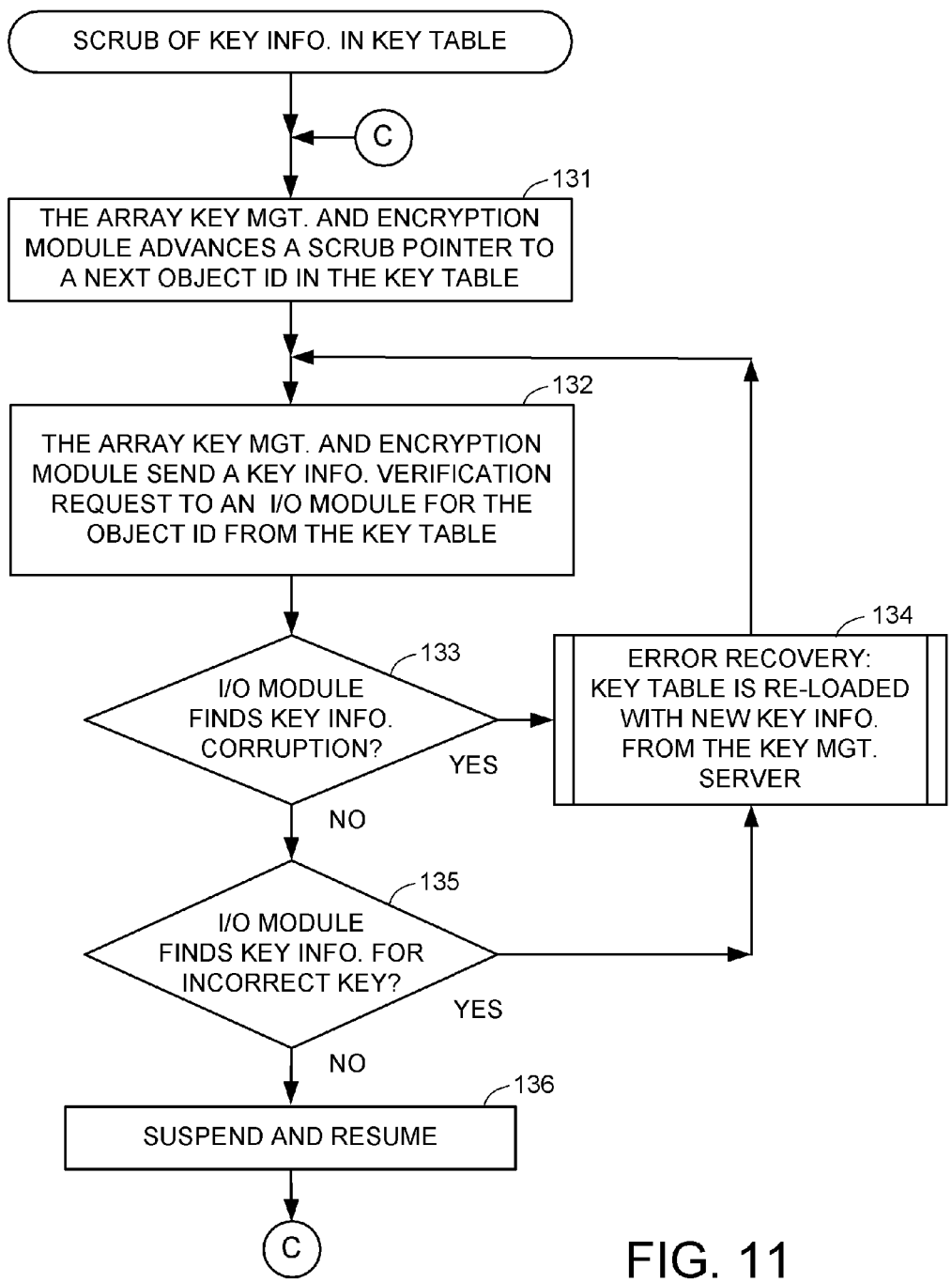
FIG. 11 is a flowchart of a routine for checking a key table for erroneous entries, and fixing an erroneous entry.

FIG. 11 is a flowchart of a routine for checking a key table for erroneous entries, and fixing an erroneous entry. Such a procedure is used for scrubbing of global memory in background, or on demand in response to detection of global memory errors. The array key management and encryption module scans entries of its key table and invokes an I/O module associated with the object ID of each entry to check the key information for corruption and correctness.

In a first step 131, the array key management and encryption module advances a scrub pointer to a next object ID in the key table. In step 132, the array key management and encryption module sends a key info. verification request to an I/O module for the object ID from the key table. For example, the I/O module is selected by decoding the object ID or else by looking up the object ID in the device table and referencing device information for the object ID from the device table. The I/O module responds to the key info. verification request as described above with reference to FIG. 6 except that it returns a confirmation of verification of the key info. instead of performing an I/O operation or encryption or decryption of the object in the absence of any key corruption or key correctness error. In step 133, if the I/O module finds corruption of the key information, then execution branches from step 133 to step 134 to perform error recovery as described further below with reference to FIGS. 12 to 15. If the error recovery is successful, then the key table is re-loaded with new key info. from the key management server, and execution loops back to step 132 to restart the verification of the key table entry.

In step 133, if the I/O module does not find corrupted key information, then execution continues to step 135. In step 135, if the I/O module finds that the key information from the key table entry is incorrect for the object ID from the key table entry, then execution branches to step 134 to perform error recover, as further described below with reference to FIGS. 12-15. Otherwise, the I/O module has verified that the table entry includes uncorrupted key information that is correct for the object ID in the table entry, so execution continues from step 135 to step 136. In step 136, the checking task is suspended for a time to perform higher priority task. When execution resumes, execution loops back to step 131 to check a next object ID in the key table.

FIGS. 12 to 15 show a procedure for error recovery from corrupt or incorrect key information for a storage object. In general, if an I/O module of a storage processor detects corrupt or incorrect key information of an object from the key table of the storage processor, then a new copy of the key information for the object ID is obtained from key management server and re-loaded into the key table. If this new copy of the key information is corrupt or incorrect, then the device table of the storage processor is accessed to find the key UUID associated with the object in the device table of the storage processor, and a new copy of the key information for the key UUID is obtained from the key management server and re-loaded into the key table. If this new copy of the key information is corrupt or incorrect, then an attempt is made to get correct key information from the device table of the other storage processor in the storage system. If this new copy of the key information is corrupt or incorrect, then the device table of this other storage processor is accessed to find the key UUID associated there with the object ID. If this key UUID is not the same as a key UUID previously found for the object ID, then it is used to fetch a new copy of the key information from the key management server. If this new copy of the key information is corrupt or incorrect, then an attempt is made to find a key UUID associated with the object ID in storage of the data processing system or in an archive index or in archive storage, and if this key UUID is not the same as a key UUID previously found for the object ID, then it is used to fetch a new copy of the key information from the key management server.

Figure 12:
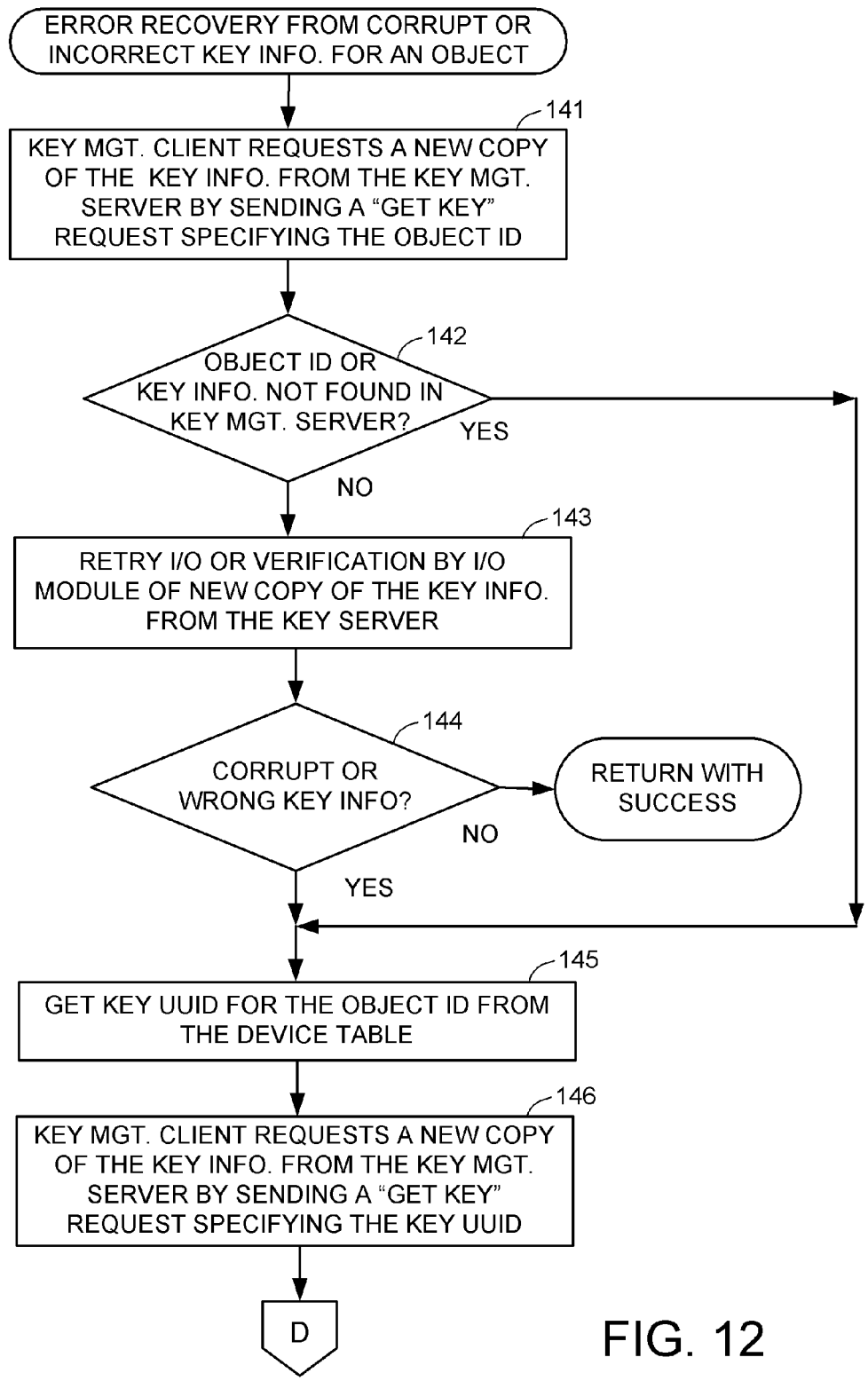
FIGS. 12 to 15 together comprise a flowchart of a procedure for error recovery from corrupt or incorrect key information for a storage object.
Figure 13:
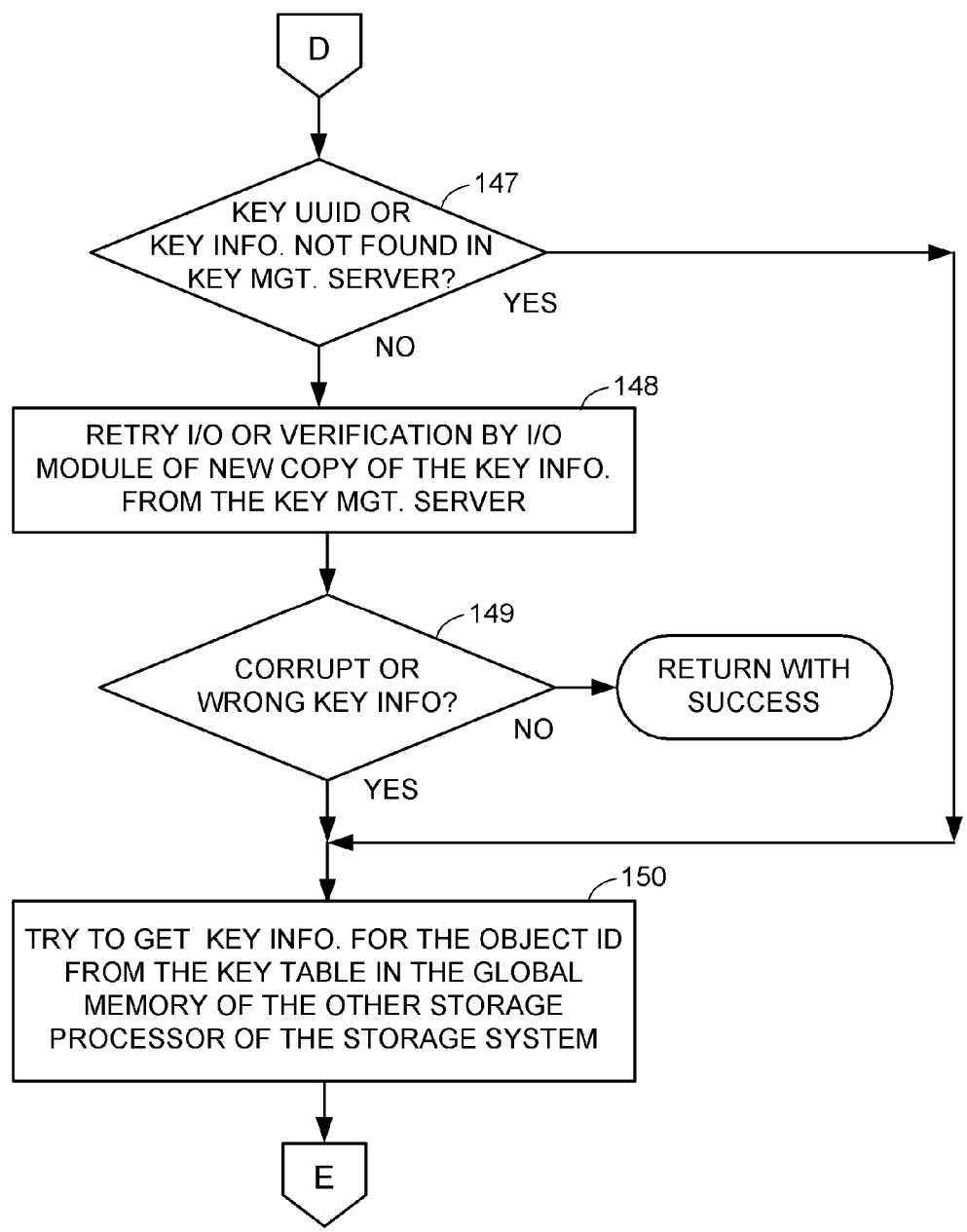
Figure 14:
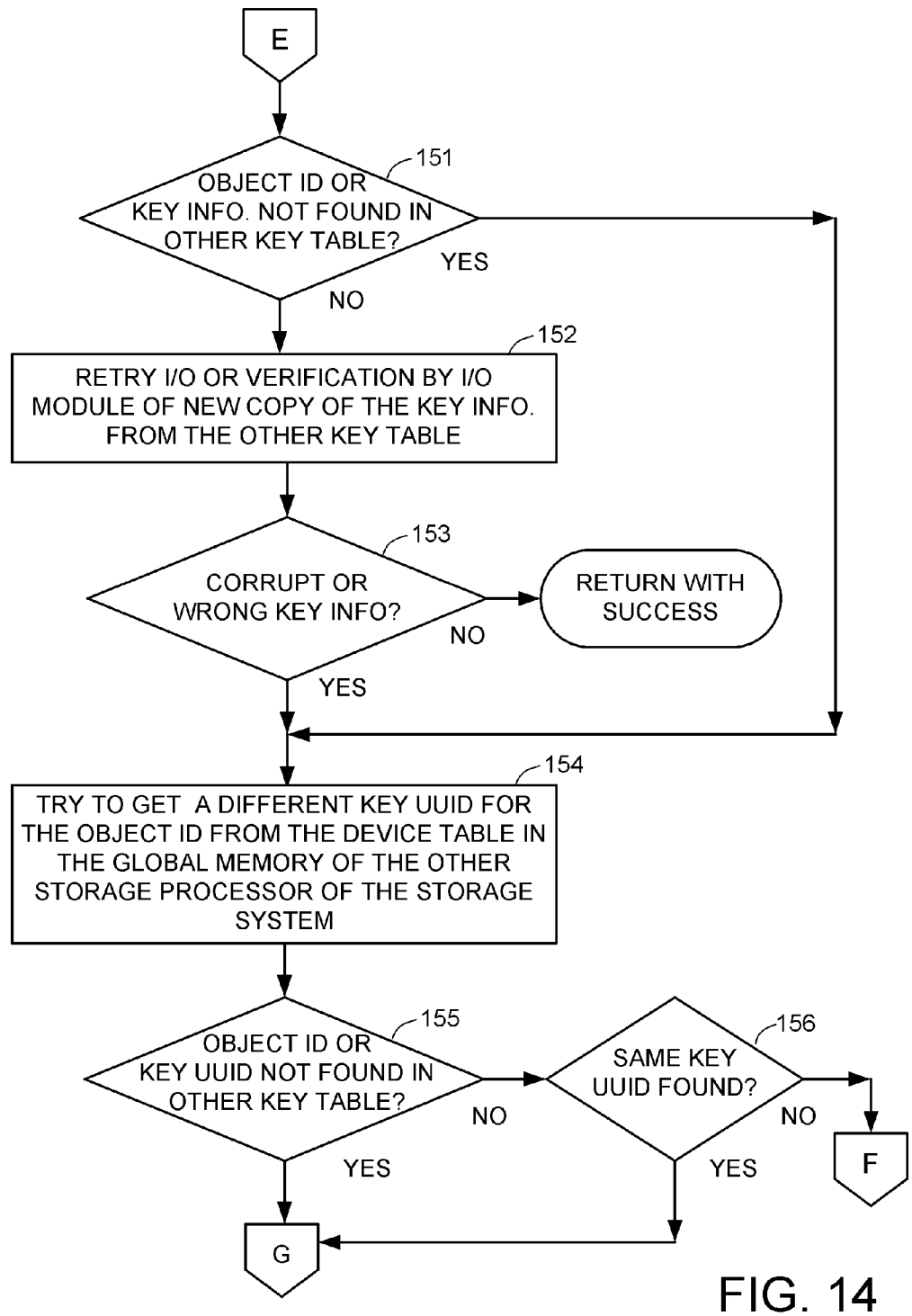

In a first step 141 in FIG. 12, in response to an I/O module finding corrupt or incorrect key information for a specified object ID, the key management client of the storage processor of the I/O module requests a new copy of the key info. from the key management server by sending a "get key" request specifying the object ID. In step 142, if the key management server finds key information associated with the object ID in the storage system namespace in its key store, then execution continues to step 143. In step 143, the I/O request or verification request is resubmitted to the I/O module using the new copy of the key information from the key management server. In step 144, unless the I/O module finds that this new copy of the key information is corrupt or incorrect for the object ID, then the error recovery routine returns with success. Otherwise, execution continues from step 144 to step 145. Execution also continues to step 145 from step 142 if the key management server did not find key information associated with the specified object ID in its key store.

In step 145, the storage processor gets the key UUID associated with the object ID from its device table. In step 146, the key management client of the storage processor requests a new copy of the key information by sending a "get key" request specifying the key UUID to the key management server. In step 147, if the key management server finds key information associated with the key UUID in its key storage, then execution continues to step 148. In step 148, I/O request or verification request is resubmitted to the I/O module using the new copy of the key information from the key management server. In step 149, unless the I/O module finds that this new copy of the key information is corrupt or incorrect for the object ID, then the error recovery routine returns with success. Otherwise, execution continues from step 149 to step 150. Execution also branches to step 150 from step 147 if the key management server does not find key information associated with the specified key UUID in its key store.

In step 150, the storage processor of the I/O module tries to get key information for the object ID from the key table in the global memory of the other storage processor of the storage system. In step 151, if key information for the object ID is obtained from the global memory of the other storage processor, then execution continues to step 152. In step 152, the I/O request or verification request is resubmitted to the I/O module using the key information from the global memory of the other storage processor. In step 153, unless the I/O module finds that this new copy of the key information is corrupt or incorrect for the object ID, then the error recovery routine returns with success. Such a case of recovering a key that could not be recovered from the key server should also be logged and reporting to the system administrator for possible diagnosis and recovery from error in the key server. Such diagnosis and recovery could involve comparison of the key recovered from the key table in step 152 to any archived keys or keys from key tables of other storage processors, and testing of any such other keys by reading and attempting to decrypt any other copies of the storage object, to decide whether or not the key server should be re-initialized with the most likely correct key. Also any recovered keys or keys that might possibly have been used for encrypting any copies of the storage object could be archived for use in possibly decrypting any copies of the storage object that might be found in the future.

In step 153, if the new copy of the key information from the other key table is found to be corrupt or incorrect for the object ID, then execution continues from step 153 to step 154. Execution also branches to step 154 from step 151 if key information associated with the object ID is not found in the key table in the global memory of the other storage processor.

In step 154, the storage processor of the I/O module tries to get a different key UUID associated with the object ID in the device table in the global memory of the other storage processor of the storage system. In step 155, if a key UUID associated with the object ID is found in the device table in the global memory of the other storage processor, then execution branches to step 156. In step 156, if the key UUID found in the device table in the global memory of the other storage processor is not the same as a previously found key UUID for the object ID, then execution branches to step 157 in FIG. 15.

Figure 15:
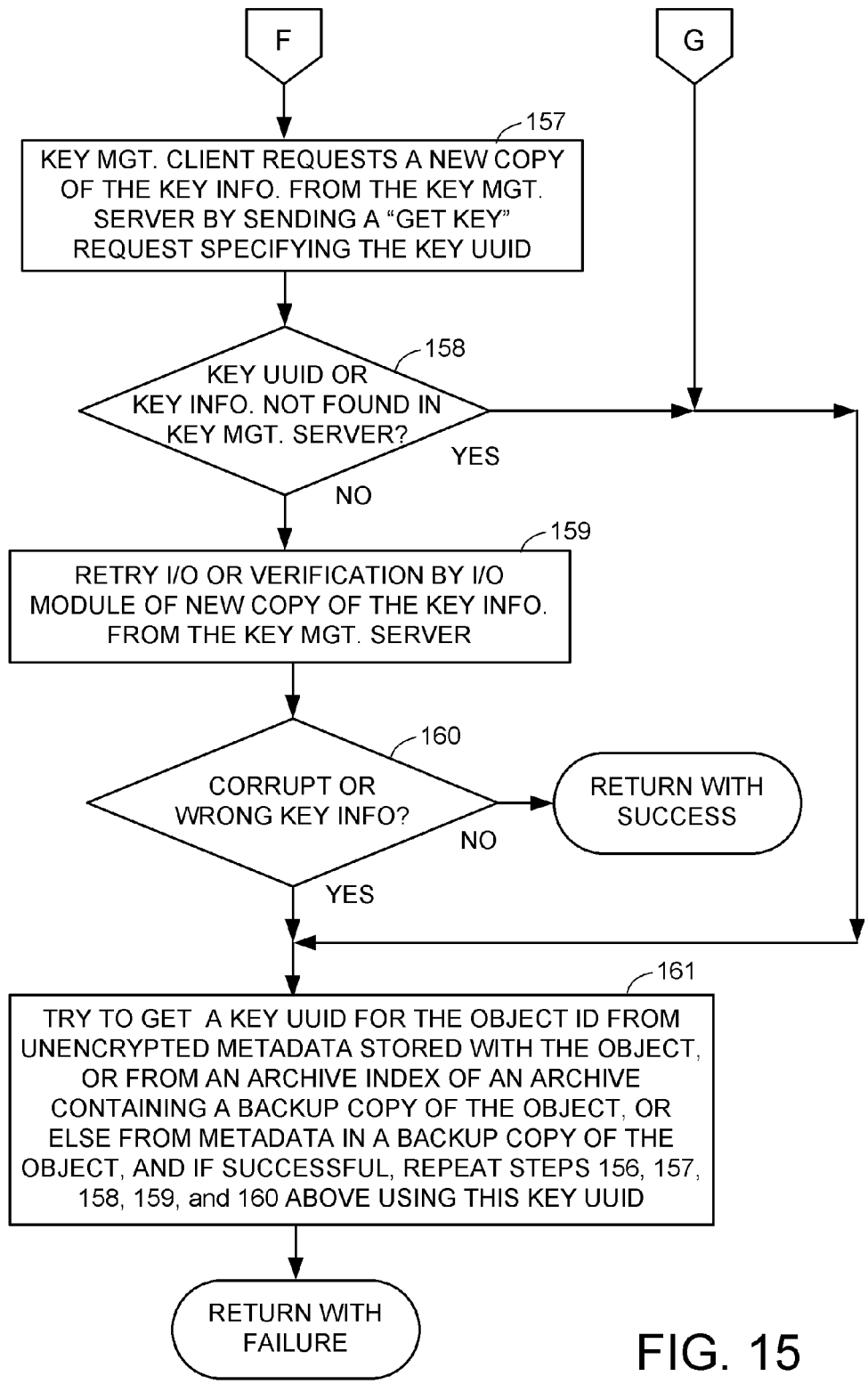

In step 157 in FIG. 15, the key management client of the storage processor of the I/O module requests a new copy of the key info. from the key management server by sending a "get key" request specifying the key UUID from the device table of the other storage processor. In step 158, if the key management server finds key information associated with this key UUID in the key store, then in step 159 the I/O request or verification request is resubmitted to the I/O module using this new copy of the key information. In step 160, unless the I/O module finds that this new copy of the key information is corrupt or incorrect for the object ID, then the error recovery routine returns with success. Otherwise, execution continues from step 160 to step 161. Execution also branches to step 161 from step 155 of FIG. 14 if a key UUID is not found associated with the object ID in the device table of the global memory of the other storage processor, or from step 156 of FIG. 14 if a key UUID is found associated with the object ID in the device table of the global memory of the other storage processor but it is the same as the key UUID previously found, or from step 158 in FIG. 15 if the key UUID or associated key info. is not found in the key store of the key management server.

When step 161 is reached, it may still be possible to get correct key information if the failure to recall correct key information from the key management server is due to corruption or confusion of the object ID with the object ID from another domain namespace. The object ID may still be associated with the key UUID of the correct key information somewhere in storage. For example, in step 161, an attempt is made to get a key UUID for the object ID from unencrypted metadata stored with the object, or from an archive index containing a backup copy of the object, or else from metadata in a backup copy of the object. If this attempt is successful, then steps 156, 157, 158, 159, and 160 are repeated using this key UUID.

Figure 16:
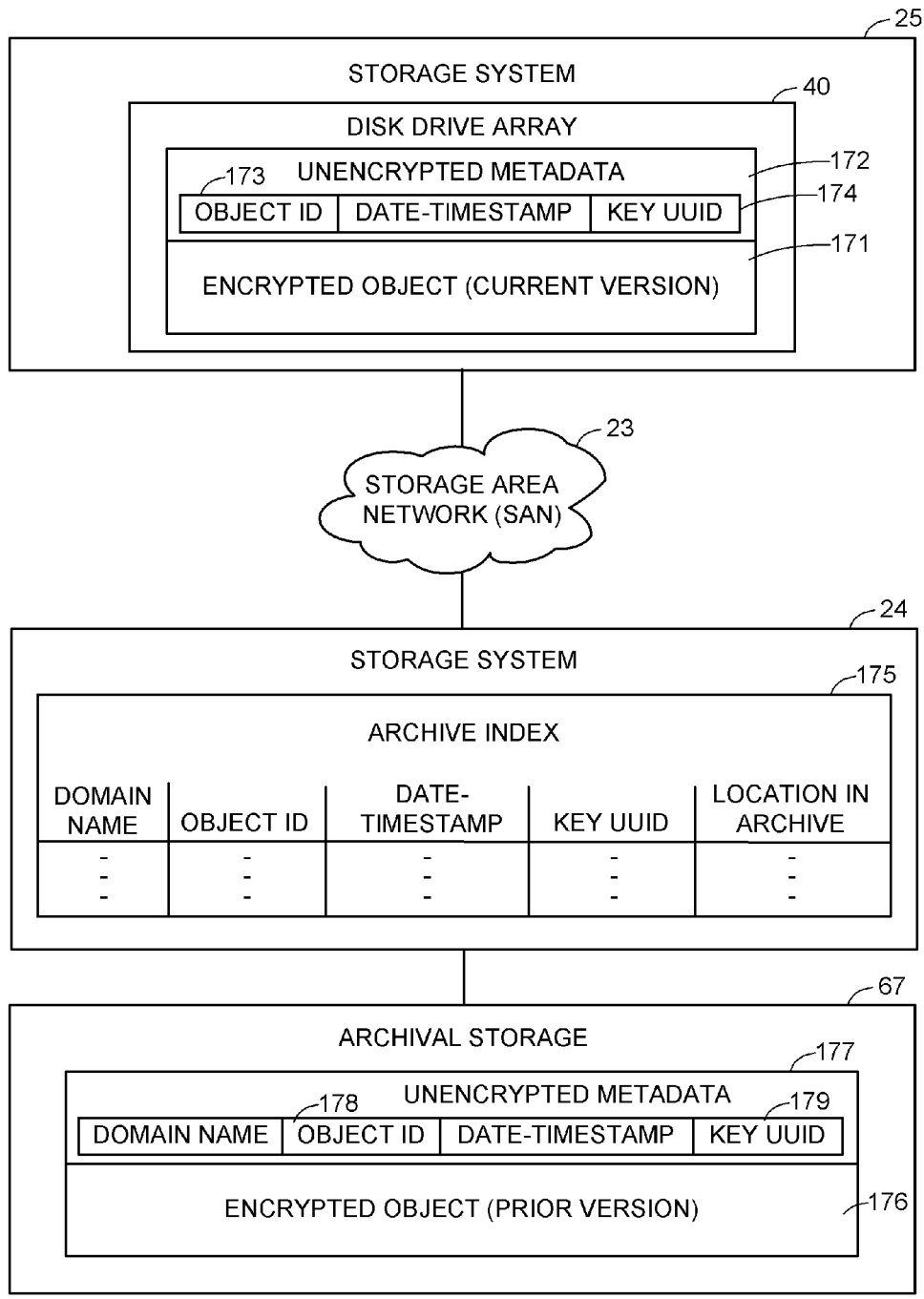
FIG. 16 shows various locations in the storage system of FIG. 1 where a key identifier for an encrypted storage object might be recovered in the event of corruption of key information.

As shown in FIG. 16, for example, an encrypted storage object 171 in a possible implementation of the disk drive array 40 of the storage system 25 has an unencrypted header 172 including the object ID 173 associated with the key UUID 174 of the data encryption key used to encrypt the object 171. A prior version 176 of the encrypted object is found in the archival storage 67 accessible to the storage system 24. The prior version 176 also has a header 177 including the object ID 178 associated with the key UUID 179 used to encrypt the object. The key UUID is also associated with the object ID in an archive index 175 in the storage system 24.

In view of the above, there has been described a failsafe key recovery mechanism in the event of confusion or loss of the association of an object identifier with its respective data encryption key. The storage systems and the key server maintain a backup index to the data encryption keys in the key server context. The backup index associates the object identifiers and their data encryption keys with an absolute key reference. If there is a failure of the data encryption key in the data storage system and this failure is not corrected by recalling the data encryption key from the key server given the object identifier and the domain name of the storage system, then the storage system uses the absolute key reference to request a new copy of the data encryption key from the key management server. The failure of the data encryption key could be a failure to recall a data encryption key for the storage object from global memory of the storage system, corruption of the data encryption key, or recall of the incorrect data encryption key from global memory of the data storage system. It is possible for there to be failure of a data encryption key that passes the key corruption and key correctness checks but nevertheless data decrypted with this data encryption key is found to be corrupted, indicating that the data encryption key could be the wrong key because the data encryption key is the key for a different object in the namespace of another data storage system. A storage system can use the absolute key reference to request the correct encryption key from the key management server when the storage system cannot find, in its own namespace, the object of a backup or archive copy of a storage object. In this case, the storage system may obtain the absolute key reference for a backup copy of an object from an index of the backup or archive copies, or from unencrypted metadata stored with the backup or archive copy. Thus, the absolute key reference can be used as a failsafe, key of last resort, to recover customer data in enterprise applications.

What is claimed is:

1. A method of encryption key recovery, said method comprising a hardware processor executing computer instructions in memory to perform the steps of:
   (a) creating a storage object for containing encrypted data in data storage of a data storage system, assigning an object identifier to the storage object for identifying the storage object in the data storage system, assigning a data encryption key to the storage object, assigning a key identifier to the data encryption key, storing the data encryption key in the data storage system in association with the object identifier, and storing the key identifier in the data storage system in association with the object identifier; and
   (b) when performing an operation upon the storage object using the data encryption key in the data storage system, detecting failure of the data encryption key in the data storage system, and in response to detecting failure of the data encryption key in the data storage system, using the object identifier for fetching the stored key identifier associated with the object identifier, and using the fetched key identifier associated with the object identifier for fetching a copy of the data encryption key from a key server computer, and resuming the operation upon the storage object using the copy of the data encryption key fetched from the key server computer.

2. The method as claimed in claim 1, wherein the data encryption key is stored in the data storage system in association with the object identifier in a first table of global memory of the data storage system, the first table stores object identifiers and respective data encryption keys for a plurality of storage objects for containing encrypted data in the data storage of the data storage system; and wherein the key identifier is stored in the data storage system in association with the object identifier in a second table of global memory of the data storage system, and the second table stores object identifiers and respective key identifiers for the plurality of storage objects.

3. The method as claimed in claim 1, wherein the object identifier is unique in the data storage system for identifying the storage object among a plurality of storage objects containing encrypted data in the data storage of the data storage system, and wherein the key identifier is unique in the key server computer for identifying the copy of the data encryption key among a multiplicity of copies of data encryption keys provided by the key server computer to a plurality of data storage systems.

4. The method as claimed in claim 1, which includes the key server computer maintaining in a key store the copy of the data encryption key in association with an identifier of the data storage system, the object identifier, and the key identifier.

5. The method as claimed in claim 1, which further includes the key server computer providing the data encryption key to the data storage system in response to a request including the object identifier and an identifier of the data storage system.

6. The method as claimed in claim 1, wherein the fetching of the key identifier associated with the object identifier is performed after the data storage system requests the key server computer to provide a copy of the data encryption key associated with the object identifier in a namespace of the data storage system, and the key server computer fails to provide a correct copy of the data encryption key assigned to the object.

7. The method as claimed in claim 1, wherein the fetching of the key identifier associated with the object identifier includes finding the key identifier associated with the object identifier in unencrypted metadata stored with the storage object in the data storage of the data storage system, and obtaining the key identifier from the unencrypted metadata.

8. The method as claimed in claim 1, wherein the fetching of the key identifier associated with the object identifier includes finding the key identifier associated with the object identifier in an archive index, and obtaining the key identifier from the archive index.

9. The method as claimed in claim 1, wherein the fetching of the key identifier associated with the object identifier includes finding the key identifier associated with the object identifier in another data storage system.

10. A method of encryption key recovery, said method comprising a hardware processor executing computer instructions in memory to perform the steps of:
    (a) creating a storage object for containing encrypted data in data storage of a data storage system, assigning an object identifier to the storage object for identifying the storage object in the data storage system, obtaining a key identifier and a data encryption key assigned to the storage object from a key server computer, storing the key identifier and the data encryption key in the data storage system in association with the object identifier, and storing the key identifier and a copy of the data encryption key in association with the object identifier and an identifier of the data storage system in a key store of the key server computer; and
    (b) when performing an operation upon the storage object using the data encryption key in the data storage system, detecting failure of the data encryption key in the data storage system, and in response to detecting failure of the data encryption key in the data storage system, requesting the key server computer to provide a copy of the data encryption key assigned to the storage object, and the key server responding by failing to provide a correct copy of the data encryption key assigned to the storage object, and in response to the key server computer failing to provide a correct copy of the data encryption key assigned to the storage object, using the object identifier for fetching the stored key identifier associated with the object identifier, and using the fetched key identifier associated with the object identifier for fetching a copy of the data encryption key from the key server computer, and resuming the operation upon the storage object using the copy of the data encryption key fetched from the key server computer.

11. The method as claimed in claim 10, wherein the data encryption key is stored in the data storage system in association with the object identifier in a first table of global memory of the data storage system, and the first table stores object identifiers and respective data encryption keys for a plurality of storage objects for containing encrypted data in the data storage of the data storage system; and wherein the key identifier is stored in the data storage system in association with the object identifier in a second table of global memory of the data storage system, and the second table stores object identifiers and respective key identifiers for the plurality of storage objects.

12. The method as claimed in claim 10, wherein the object identifier is unique in the data storage system for identifying the storage object among a plurality of storage objects containing encrypted data in the data storage of the data storage system, and wherein the key identifier is unique in the key server computer for identifying the copy of the data encryption key among a multiplicity of copies of data encryption keys provided by the key server computer to a plurality of data storage systems.

13. The method as claimed in claim 10, wherein the key server computer is requested to provide a copy of the data encryption key assigned to the storage object in a namespace of the data storage system by sending a first request including the object identifier to the key server computer, and the fetched key identifier associated with the object identifier is used for fetching a copy of the data encryption key from the key server computer by sending a second request including the key identifier to the key server computer.

14. A data storage system comprising:
data storage; and
at least one storage processor computer coupled to the data storage for storing data in the data storage;
wherein said at least one storage processor computer is programmed for creating a storage object for containing encrypted data in the data storage, assigning an object identifier to the storage object for identifying the storage object in the data storage system, obtaining a key identifier and a data encryption key assigned to the storage object from a key server computer, and storing the key identifier and the data encryption key in the data storage system in association with the object identifier; and
wherein said at least one storage processor computer is further programmed for performing an operation upon the storage object using the data encryption key in the data storage system, and when performing the operation upon the storage object using the data encryption key in the data storage system, detecting failure of the data encryption key in the data storage system, and in response to detecting failure of the data encryption key in the data storage system, using the object identifier for fetching the stored key identifier associated with the object identifier, and using the fetched key identifier associated with the object identifier for fetching a copy of the data encryption key from the key server computer, and resuming the operation upon the storage object using the copy of the data encryption key fetched from the key server computer.

15. The data storage system as claimed in claim 14, wherein the storage processor computer further includes a global memory, wherein the data encryption key is stored in the data storage system in association with the object identifier in a first table in the global memory, the first table stores object identifiers and respective data encryption keys for a plurality of storage objects for containing encrypted data in the data storage, the key identifier is stored in the data storage system in association with the object identifier in a second table in the global memory, and the second table stores object identifiers and respective key identifiers for the plurality of storage objects.

16. The data storage system as claimed in claim 14, wherein the object identifier is unique in the data storage system for identifying the storage object among a plurality of storage objects containing encrypted data in the data storage, and wherein the key identifier is unique in the key server computer for identifying the copy of the data encryption key among a multiplicity of copies of data encryption keys provided by the key server computer to a plurality of data storage systems.

17. The data storage system as claimed in claim 14, wherein said at least one storage processor computer is programmed so that fetching of the key identifier associated with the object identifier is performed after the data storage system requests the key server computer to provide a copy of the data encryption key associated with the object identifier in a namespace of the data storage system, and the data storage system determines that the key server computer fails to provide a correct copy of the data encryption key assigned to the object.

18. The data storage system as claimed in claim 14, wherein said at least one storage processor computer is programmed so that the fetching of the key identifier associated with the object identifier includes finding the key identifier associated with the object identifier in unencrypted metadata stored with the storage object in the data storage of the data storage system, and obtaining the key identifier from the unencrypted metadata.

19. The data storage system as claimed in claim 14, wherein said at least one storage processor computer is programmed so that the fetching of the key identifier associated with the object identifier includes finding the key identifier associated with the object identifier in an archive index, and obtaining the key identifier from the archive index.

20. The data storage system as claimed in claim 14, wherein said at least one storage processor computer is programmed so that the fetching of the key identifier associated with the object identifier includes finding the key identifier associated with the object identifier in another data storage system.

* * * * *